(12) United States Patent
Baehre

(10) Patent No.: US 8,811,397 B2
(45) Date of Patent: Aug. 19, 2014

(54) SYSTEM AND METHOD FOR DATA COMMUNICATION BETWEEN A USER TERMINAL AND A GATEWAY VIA A NETWORK NODE

(75) Inventor: Andreas Baehre, Nuremberg (DE)

(73) Assignee: NCP Engineering GmbH, Nuremberg (DE)

(*) Notice: Subject to any disclaimer, the term of this patent is extended or adjusted under 35 U.S.C. 154(b) by 459 days.

(21) Appl. No.: 12/706,456

(22) Filed: Feb. 16, 2010

(65) Prior Publication Data
US 2011/0200045 A1    Aug. 18, 2011

(51) Int. Cl.
    H04L 12/28    (2006.01)
(52) U.S. Cl.
    USPC ............ 370/392; 370/465; 370/469
(58) Field of Classification Search
    None
    See application file for complete search history.

(56) References Cited

U.S. PATENT DOCUMENTS

| | | | |
|---|---|---|---|
| 6,947,431 B1* | 9/2005 | Bergeron et al. | 370/401 |
| 7,088,727 B1* | 8/2006 | Short et al. | 370/401 |
| 7,107,614 B1 | 9/2006 | Boden et al. | |
| 7,155,740 B2* | 12/2006 | Brustoloni | 726/15 |
| 7,237,263 B1 | 6/2007 | Boscolo et al. | |
| 7,302,487 B2 | 11/2007 | Ylonen et al. | |
| 7,310,730 B1 | 12/2007 | Champagne et al. | |
| 7,340,519 B1 | 3/2008 | Golan et al. | |
| 7,373,661 B2 | 5/2008 | Smith et al. | |
| 7,486,659 B1 | 2/2009 | Unbehagen et al. | |
| 7,743,245 B2* | 6/2010 | Khosravi | 713/151 |
| 8,059,641 B1* | 11/2011 | Rai | 370/389 |
| 8,351,333 B2* | 1/2013 | Rao et al. | 370/235 |
| 8,559,449 B2* | 10/2013 | Rao et al. | 370/401 |
| 8,634,420 B2* | 1/2014 | Rao et al. | 370/392 |
| 2002/0046348 A1* | 4/2002 | Brustoloni | 713/201 |
| 2003/0167403 A1 | 9/2003 | McCurley et al. | |

(Continued)

FOREIGN PATENT DOCUMENTS

| | | |
|---|---|---|
| EP | 1 588 535 B1 | 7/2008 |
| EP | 1 798 890 B1 | 3/2009 |
| WO | WO 2005/048106 A2 | 5/2005 |

OTHER PUBLICATIONS

Extended European Search Report dated May 16, 2011 for European Patent Application No. 11154381.5.

Primary Examiner — Michael J Moore, Jr.
(74) Attorney, Agent, or Firm — Johnson, Marcou & Isaacs, LLC

(57) ABSTRACT

Systems and methods are provided for communicating data. A user terminal is connected to a first data communication network, and a first network node is connected to the first and a second data communication network. A gateway is connected to the second and a third data communication network. The user terminal packetizes data according to protocols corresponding to a protocol stack. The user terminal further transmits packetized data to the gateway via the first network node and via the first and second data communication networks and determines whether the packetized data arrived at the gateway. The user terminal also modifies the packetized data by replacing at least a part of a first header corresponding to a specific protocol of the protocol stack with a replacement. When the gateway receives the packetized data it depacketizes the data and generates, based upon replacement information, a specific payload according to a predefined protocol.

21 Claims, 14 Drawing Sheets

(56) References Cited

U.S. PATENT DOCUMENTS

| | | |
|---|---|---|
| 2003/0200321 A1 | 10/2003 | Chen et al. |
| 2006/0005008 A1 | 1/2006 | Kao |
| 2006/0080441 A1 | 4/2006 | Chen et al. |
| 2007/0147363 A1 | 6/2007 | Oswal et al. |
| 2008/0043640 A1 | 2/2008 | Smith et al. |
| 2008/0046996 A1 | 2/2008 | Smith et al. |
| 2008/0101366 A1 | 5/2008 | Venkitaraman et al. |
| 2014/0007218 A1* | 1/2014 | Rao et al. .................. 726/13 |

* cited by examiner

SYSTEM AND METHOD FOR DATA COMMUNICATION BETWEEN A USER TERMINAL AND A GATEWAY VIA A NETWORK NODE

TECHNICAL FIELD

The present application relates to data communication between a user terminal and a gateway, and more particularly relates to methods, systems and computer-readable media to allow for data communications between a user terminal and a gateway via a network node and at least two data communication networks.

BACKGROUND

The development of computer systems and networks allowed the physical separation of user applications and data storage. For instance, server technology provides for storing any kind of data, such as files, e-mails, databases etc., on a powerful server computer. Thus, smaller and cheaper computer systems, such as user terminals, desktop computers, mobile device etc. could be used to gain access to the server computer and its stored data. For example, companies and offices were able to build up data communication networks between user terminals and server computers or other network storage devices. Such data communication networks are also referred to as local area networks (LAN), since they are usually limited to a specific geographical area, e.g. a building, a floor, a plurality of rooms etc.

With the development of wide-area networks, such as the internet or public telephone networks, the local area networks could be interconnected and accessed from any geographically independent computing device. Further, the computer networks of different organizations can be connected to exchange data, for example, for collaboration. The telephone networks were also capable of transmitting data, and hence allowed the access to a local network from any user terminal connected to a telephone line.

The downsizing of computing devices further expedited the use of external network connections to gain access to a local area network. For instance, the employee of a company is able to access the company's network and computing devices from home or from a hotel using a mobile device.

The accessibility of local area networks from public networks, however, came with the risk that malicious users were also able to access computing devices and data of a local network, such as that of a company.

A solution to protect a network from outside attacks is a firewall installed on a particular network node. This particular network node is the only device connected to the public or external network and is also connected to the local network. Thus, the local network could be separated from the public or external network. Examples of such a network node are a proxy server, a gateway, a router or a bridge to name a few.

These devices may also have an integrated firewall to control network traffic between the local network and the wide-area or public network. A firewall blocks many connections from the outside and provides secure access to the local network for authorized computing devices only. One such secure access technique is known as virtual private networks (VPNs), where two devices create a secure connection for data communication over a public network. Such a virtual private network provides a data communication interface between a user terminal and a gateway that protects a private or local network. For instance, a VPN client can be implemented on any user terminal, for example on a laptop of an employee, which is configured to establish a secure connection to the gateway within the network of his firm. Since the gateway and the VPN client can be preconfigured, they are able to authenticate themselves and to exchange security measures, such as cryptographic keys for encrypting and decrypting the data communication.

In addition, particular protocols have been established to allow the exchange of secure information, for example during the setup of a VPN. For instance, a VPN client needs to authenticate itself at the gateway, so that the gateway will allow the access of the local network protected by the gateway. One of these authentication protocols is the internet key exchange protocol (IKE) which handles the negotiation of protocols and generates the encryption/authentication keys used by a security protocol. This security protocol may, for example, be internet protocol security (IPsec). Other security protocols may be a combination of hypertext transfer protocol (HTTP) and secure socket layer (SSL), also referred to as hypertext transfer protocol secure (HTTPS).

With the growing mobility of user terminals the provision of broadband network connections, such as DSL, also increases. For example, public hotspots providing wireless network connections to their customers or cable-based public access points, such as an internet kiosk or a hotel, become more and more available. These publicly-available networks may also be protected, e.g. using a router or gateway similar to the one described above. Again, for security reasons such a router or gateway will only allow particular connections to the wide-area network.

For instance, a hotel may offer to its customers an internet connection via broadband. Thus, the router or gateway may allow outgoing connections on particular network ports which are necessary for internet access. Using the internet for the end user means in most cases surfing the World Wide Web with a web browser, e.g. Microsoft Internet Explorer, Mozilla Firefox, Apple Safari, etc. The standard communication to visit websites is HTTP-based. Further, standardized protocols, e.g. Transmission Control Protocol (TCP), will have standardized ports for network traffic. In the example above, TCP uses ports 80 and 443 for HTTP and HTTPS connections, respectively. Thus, some providers, such as a hotel or an internet kiosk, may restrict connections to the outgoing ports 80 and 443.

This restriction to two available ports only may, however, affect the establishment of other secure network connections. In particular, while the average users should not encounter any problems when surfing the web, business users who need secure connections to access their company networks cannot access their headquarters due to the limitation to ports 80 and 443.

If a secure connection may use a different standardized protocol or another proprietary protocol which does not use one of the above ports, such secure connection may not be established due to the restrictions set by the provider.

It is therefore an object of the invention to provide a method and system for communicating data between two devices via a restrictive network node.

SUMMARY

According to an embodiment of the invention, a user terminal for communicating data to and from a predetermined gateway via data communication networks and at least one network node is defined. The user terminal is connected to a first data communication network, and a first network node is connected to the first data communication network and a second data communication network. Further, the predetermined gateway is a second network node connected to the second data communication network and a third data communication network. The user terminal comprises means for packetizing data, where the means for packetizing data are adapted to packetize input data according to protocols corresponding to a predetermined protocol stack by forming, for each of the protocols of the predetermined protocol stack, a respective data packet including a respective header and a respective payload segment, and where the means for packetizing data are adapted to output packetized data. The user terminal further includes means for transmitting the packetized data to the predetermined gateway via the first network node and via the first and second data communication networks, and means for determining whether the packetized data arrived at the predetermined gateway. The user terminal also includes means for modifying the packetized data based on an output of the means for determining, where the means for modifying are adapted to replace at least a part of a first header in the packetized data with a replacement. The first header corresponds to a specific protocol of the predetermined protocol stack.

In a further embodiment of the invention the means for modifying the packetized data are adapted to provide modified packetized data to the means for transmitting the packetized data, the modified packetized data being packetized data where at least a part of the first header is replaced with the replacement. The means for transmitting the packetized data are further adapted to transmit the modified packetized data to the predetermined gateway via the first network node and via the first and second data communication networks.

According to a further embodiment, the means for modifying the packetized data are adapted to replace the complete first header with a second header.

According to another embodiment, the first header corresponds to a header resulting from packetizing the input data according to the specific protocol of the predetermined protocol stack, and the second header corresponds to a header resulting from packetizing the input data according to a replacement protocol not comprised in the predetermined protocol stack.

In a further embodiment of the invention the means for modifying the packetized data are adapted to provide protocol information to the means for packetizing data, the protocol information identifying the replacement protocol. Further, the means for packetizing data are adapted to form the second header according to the protocol information.

In yet another embodiment of the invention the means for modifying the packetized data are adapted to insert a third header into the packetized data.

Further, according to an embodiment of the invention, the means for modifying the packetized data are adapted to replace a value of a field of one of the first to third header with a new value.

According to an embodiment, the field is a destination port number field, the value of the destination port number field is a value standardized for the specific protocol of the predetermined protocol stack according to which the input data was packetized, and the new value is a value of a destination port number field standardized for a protocol different from the specific protocol.

According to another embodiment of the invention, the user terminal further comprises means for storing a header configuration of the packetized data, the header configuration including information identifying the replacement. The means for packetizing data are adapted to packetize subsequent input data according to the protocols corresponding to the predetermined protocol stack and according to the header configuration, thereby forming subsequent packetized data having at least a part of a header replaced with a replacement. Moreover, the means for transmitting the packetized data are adapted to transmit the subsequent packetized data to the predetermined gateway via the first network node and via the first and second data communication networks.

According to a further embodiment of the invention, the means for determining whether the packetized data arrived at the predetermined gateway are adapted to determine whether a reply message from the predetermined gateway was received at the user terminal.

According to another embodiment, the means for determining whether the packetized data arrived at the predetermined gateway are adapted to determine whether the reply message was received at the user terminal within a predetermined time period after the means for transmitting have transmitted the packetized data.

A further embodiment of the invention relates to a user terminal for transmitting data to a predetermined gateway via data communication networks and at least one network node. The user terminal is connected to a first data communication network, and a first network node is connected to the first data communication network and a second data communication network. Further, the predetermined gateway is a second network node connected to the second data communication network and a third data communication network. The user terminal comprises a packetizing unit adapted to packetize input data according to protocols corresponding to a predetermined protocol stack by forming, for each of the protocols of the predetermined protocol stack, a respective data packet including a respective header and a respective payload segment, where the packetizing unit is adapted to output packetized data. The user terminal also includes a transmitting unit adapted to transmit the packetized data to the predetermined gateway via the first network node and via the first and second data communication networks, and a determination unit adapted to determine whether the packetized data arrived at the predetermined gateway. Moreover, the user terminal includes a modification unit adapted to modify the packetized data based on an output of the determination unit, where the modification unit is adapted to replace at least a part of a first header in the packetized data with a replacement. The first header corresponds to a specific protocol of the predetermined protocol stack.

According to another embodiment, the modification unit is adapted to provide modified packetized data to the transmitting unit, the modified packetized data being packetized data, where at least a part of the first header is replaced with the replacement. The transmitting unit is adapted to transmit the modified packetized data to the predetermined gateway via the first network node and via the first and second data communication networks.

According to yet another embodiment, the modification unit is adapted to replace the complete first header with a second header.

In a further embodiment of the invention the first header corresponds to a header resulting from packetizing the input data according to the specific protocol of the predetermined protocol stack, and the second header corresponds to a header resulting from packetizing the input data according to a replacement protocol not comprised in the predetermined protocol stack.

According to an embodiment, the modification unit is adapted to provide protocol information to the packetizing unit, the protocol information identifying the replacement protocol, where the packetizing unit is also adapted to form the second header according to the protocol information.

According to yet another embodiment, the modification unit is adapted to insert a third header into the packetized data.

In another embodiment of the invention the modification unit is adapted to replace a value of a field of one of the first to third header with a new value.

According to a further embodiment, the field is a destination port number field, the value of the destination port number field equals a value standardized for a specific protocol of the predetermined protocol stack according to which the input data was packetized, where the new value equals a value of a destination port number field standardized for a protocol different from the specific protocol.

According to yet another embodiment, the user terminal further comprises a storage unit adapted to store a header configuration of the packetized data, the header configuration including information identifying the replacement. The packetizing unit is adapted to packetize subsequent input data according to the protocols corresponding to the predetermined protocol stack and according to the header configuration, thereby forming subsequent packetized data having at least a part of a first header replaced with a replacement. Further, the transmitting unit is adapted to transmit the subsequent packetized data to the predetermined gateway via the first network node and via the first and second data communication networks.

According to a further embodiment, the determination unit is adapted to determine whether a reply message from the predetermined gateway was received at the user terminal.

According to another embodiment, the determination unit is adapted to determine whether the reply message was not received at the user terminal within a predetermined time period after the transmitting unit has transmitted the packetized data.

According to a further embodiment, the invention relates to a gateway for communicating data to and from at least one user terminal via data communication networks and at least one network node. The at least one user terminal is connected to a first data communication network, and a first network node is connected to the first data communication network and a second data communication network. Further, the gateway, being a second network node, is connected to the second data communication network and a third data communication network. The gateway comprises means for receiving packetized data from a specific user terminal, the packetized data being packetized according to protocols corresponding to a predetermined protocol stack by forming, for each of the protocols of the predetermined protocol stack, a respective data packet including a respective header and a respective payload segment. Further, the gateway includes means for detecting a modification to the packetized data, where the means for detecting a modification are adapted to detect whether at least a part of a first header in the packetized data was replaced with a replacement and are adapted to output replacement information indicating at least the first header. The gateway also includes means for depacketizing data, that are adapted to depacketize the packetized data by removing at least one of the respective headers from the packetized data and generating a payload segment according to at least one respective protocol of the predetermined protocol stack. The payload segment is a remaining part of the packetized data after removing the at least one respective header. The gateway also comprises means for transmitting a message to the specific user terminal, where the message indicates that the packetized data arrived at the gateway. The means for depacketizing data are further adapted to generate, based upon the replacement information, a specific payload segment according to a predefined protocol of the predetermined protocol stack. The specific payload segment is associated with the first header.

According to another embodiment, the first header of the received packetized data corresponds to a header resulting from packetizing data according to a replacement protocol, and the replacement protocol is not comprised in the predetermined protocol stack.

According to yet another embodiment, the means for depacketizing data are adapted to remove an additional header from the received packetized data, the additional header being inserted in addition to the modification to the packetized data.

In a further embodiment the means for receiving packetized data are adapted to receive data on at least two network ports, where a first port number corresponds to a value standardized for the predefined protocol and a second port number corresponds to a value standardized for the replacement protocol.

According to a further embodiment, the invention relates to a gateway for communicating data to and from at least one user terminal via data communication networks and at least one network node. The at least one user terminal is connected to a first data communication network, while a first network node is connected to the first data communication network and a second data communication network. The gateway, being a second network node, is connected to the second data communication network and a third data communication network. The gateway comprises a receiving unit adapted to receiving packetized data from a specific user terminal. The packetized data is packetized according to protocols corresponding to a predetermined protocol stack by forming, for each of the protocols of the predetermined protocol stack, a respective data packet including a respective header and a respective payload segment. The gateway also comprises a detecting unit adapted to detect whether at least a part of a first header in the packetized data was replaced with a replacement and adapted to output replacement information indicating at least the first header. The gateway further includes a depacketizer adapted to depacketize the packetized data by removing at least one of the respective headers from the packetized data and generating a payload segment according to at least one respective protocol of the predetermined protocol stack. The payload segment is a remaining part of the packetized data after removing the at least one respective header. The gateway also includes a transmitting unit adapted to transmit a message to the specific user terminal, where the message indicates that the packetized data arrived at the gateway. The depacketizer is adapted to generate, based upon the replacement information, a specific payload segment according to a predefined protocol of the predetermined protocol stack. The specific payload segment is associated with the first header.

According to an embodiment, the first header of the received packetized data corresponds to a header resulting from packetizing data according to a replacement protocol. The replacement protocol is not comprised in the predetermined protocol stack.

According to another embodiment, the depacketizer is adapted to remove an additional header from the received packetized data. The additional header is inserted in addition to the modification to the packetized data.

According to yet another embodiment, the depacketizer is adapted to receive data on at least two network ports, where a first port number corresponds to a value standardized for the predefined protocol and a second port number corresponds to a value standardized for the replacement protocol.

The invention also relates, according to an embodiment, to a system for communicating data via data communication networks and at least one network node. The system comprises a user terminal connected to a first data communication network, a first network node connected to the first data communication network and a second data communication network and a gateway that is a second network node connected to the second data communication network and a third data communication network. The user terminal comprises means for packetizing data adapted to packetize input data according to protocols corresponding to a predetermined protocol stack by forming, for each of the protocols of the predetermined protocol stack, a respective data packet including a respective header and a respective payload segment. The means for packetizing data are also adapted to output packetized data. The user terminal also comprises means for transmitting the packetized data to the gateway via the first network node and via the first and second data communication networks, and means for determining whether the packetized data arrived at the predetermined gateway. Further, the user terminal includes means for modifying the packetized data based on an output of the means for determining. The means for modifying are adapted to replace at least a part of a first header in the packetized data with a replacement, where the first header corresponds to a specific protocol of the predetermined protocol stack. Moreover, the gateway comprises means for receiving the packetized data from the user terminal via the first network node and via the first and second data communication networks and means for detecting a modification to the packetized data. The means for detecting a modification are adapted to detect whether at least a part of the first header in the packetized data was replaced with the replacement and are adapted to output replacement information indicating at least the first header. The gateway further includes means for depacketizing data that are adapted to depacketize the packetized data by removing at least one of the respective headers from the packetized data and generating a payload segment according to at least one respective protocol of the predetermined protocol stack. The payload segment is a remaining part of the packetized data after removing the at least one respective header. The gateway also includes means for transmitting a message to the user terminal indicating that the packetized data arrived at the gateway. Moreover, the means for depacketizing data are adapted to generate, based upon the replacement information, a specific payload segment according to a predefined protocol of the predetermined protocol stack, where the specific payload segment is associated with the first header.

According to an embodiment of the invention, the means for modifying the packetized data are adapted to replace the complete first header with a second header, where the first header corresponds to a header resulting from packetizing the input data according to the predefined protocol of the predetermined protocol stack, and the second header corresponds to a header resulting from packetizing the input data according to a replacement protocol not comprised in the predetermined protocol stack.

According to another embodiment, the means for modifying the packetized data are adapted to provide protocol information to the means for packetizing data, where the protocol information identifies the replacement protocol. The means for packetizing data are also adapted to form the second header according to the protocol information.

According to yet another embodiment, the means for modifying the packetized data are adapted to insert a third header into the packetized data. The means for depacketizing data are further adapted to remove the third header from the received packetized data.

According to a further embodiment, the invention relates to a method for communicating data to and from a predetermined gateway via data communication networks and at least one network node. A user terminal is connected to a first data communication network, and a first network node is connected to the first data communication network and a second data communication network. The predetermined gateway is a second network node connected to the second data communication network and a third data communication network. The method comprises the steps of generating packetized data, where generating comprises packetizing input data according to protocols corresponding to a predetermined protocol stack by forming, for each of the protocols of the predetermined protocol stack, a respective data packet including a respective header and a respective payload segment. Further, the method comprises transmitting the packetized data from the user terminal to the predetermined gateway via the first network node and via the first and second data communication networks, and determining whether the packetized data arrived at the predetermined gateway. Another method step is modifying the packetized data based on a result of the determining. Moreover, modifying comprises replacing at least a part of a first header in the packetized data with a replacement, where the first header corresponds to a specific protocol of the predetermined protocol stack.

According to another embodiment, the method further comprises transmitting the modified packetized data from the user terminal to the predetermined gateway via the first network node and via the first and second data communication networks.

According to yet another embodiment, the step of modifying the packetized data comprises replacing the complete first header with a second header.

In a further embodiment the first header corresponds to a header resulting from packetizing the input data according to the specific protocol of the predetermined protocol stack, and the second header corresponds to a header resulting from packetizing the input data according to a replacement protocol not comprised in the predetermined protocol stack.

According to a further embodiment, the step of replacing the first header with the second header comprises forming the second header according to protocol information, the protocol information identifying the replacement protocol.

Also in accordance with an embodiment of the invention, the step of modifying the packetized data comprises inserting a third header into the packetized data.

According to another embodiment, the step of modifying the packetized data comprises replacing a value of a field of one of the first to third header with a new value.

According to yet another embodiment, the field is a destination port number field, the value of the destination port number field is a value standardized for the specific protocol of the predetermined protocol stack according to which the input data was packetized, and the new value is a value of a destination port number field standardized for a protocol different from the specific protocol.

According to a further embodiment, the method further comprises the step of storing a header configuration of the packetized data, where the header configuration includes information identifying the replacement. The method also includes the step of packetizing subsequent input data according to the protocols corresponding to the predetermined protocol stack and according to the header configuration. The step of packetizing subsequent input data comprises forming subsequent packetized data having at least a part of a header replaced with a replacement. Further, the method comprises the step of transmitting the subsequent packetized data from the user terminal to the predetermined gateway via the first network node and via the first and second data communication networks.

According to another embodiment, the step of determining whether the packetized data arrived at the predetermined gateway comprises determining whether a reply message from the predetermined gateway was received at the user terminal.

According to yet another embodiment, the step of determining whether the packetized data arrived at the predetermined gateway comprises determining whether the reply message was received at the user terminal within a predetermined time period after transmitting the packetized data.

In accordance with another embodiment, the invention relates to a method for communicating data to and from at least one user terminal via data communication networks and at least one network node. The at least one user terminal is connected to a first data communication network. A first network node is connected to the first data communication network and a second data communication network. Further, a gateway, being a second network node, is connected to the second data communication network and a third data communication network. The method includes the step of receiving, at the gateway, packetized data from a specific user terminal. The packetized data is packetized according to protocols corresponding to a predetermined protocol stack by forming, for each of the protocols of the predetermined protocol stack, a respective data packet including a respective header and a respective payload segment. Further, the method includes the steps of detecting whether at least a part of a first header in the packetized data was replaced with a replacement and outputting replacement information indicating at least the first header. The method also includes the step of depacketizing the packetized data, where depacketizing comprises removing at least one of the respective headers from the packetized data and generating a payload segment according to at least one respective protocol of the predetermined protocol stack. The payload segment is a remaining part of the packetized data after removing the at least one respective header. Another method step is transmitting a message from the gateway to the specific user terminal, where the message indicates that the packetized data arrived at the gateway. Moreover, the step of depacketizing comprises generating, based upon the replacement information, a specific payload segment according to a predefined protocol of the predetermined protocol stack, where the specific payload segment is associated with the first header.

According to an embodiment, the first header of the received packetized data corresponds to a header resulting from packetizing data according to a replacement protocol that is not comprised in the predetermined protocol stack.

According to another embodiment, the step of depacketizing data comprises removing an additional header from the received packetized data, where the additional header is inserted in addition to the modification to the packetized data.

According to yet another embodiment, the step of receiving packetized data comprises receiving data on at least two network ports, where a first port number corresponds to a value standardized for the predefined protocol and a second port number corresponds to a value standardized for the replacement protocol.

According to an embodiment, the invention further relates to a computer-readable medium having computer-executable instructions stored thereon, that are adapted to perform, when executed by a processor of a user terminal, a method for communicating data to and from a predetermined gateway via data communication networks and at least one network node. The user terminal is connected to a first data communication network, while a first network node is connected to the first data communication network and a second data communication network. The predetermined gateway is a second network node connected to the second data communication network and a third data communication network. The method comprises the step of generating packetized data including packetizing input data according to protocols corresponding to a predetermined protocol stack by forming, for each of the protocols of the predetermined protocol stack, a respective data packet including a respective header and a respective payload segment. The method also includes the steps of transmitting the packetized data from the user terminal to the predetermined gateway via the first network node and via the first and second data communication networks, and determining whether the packetized data arrived at the predetermined gateway. Further, the method comprises the step of modifying the packetized data based on a result of the determining, where modifying comprises replacing at least a part of a first header in the packetized data with a replacement. The first header corresponds to a specific protocol of the predetermined protocol stack.

According to another embodiment, the computer-readable medium further comprises computer-executable instructions that are adapted to perform the method step of transmitting the modified packetized data from the user terminal to the predetermined gateway via the first network node and via the first and second data communication networks.

According to yet another embodiment, the step of modifying the packetized data comprises replacing the complete first header with a second header.

In a further embodiment the first header corresponds to a header resulting from packetizing the input data according to the specific protocol of the predetermined protocol stack, and the second header corresponds to a header resulting from packetizing the input data according to a replacement protocol not comprised in the predetermined protocol stack.

According to a further embodiment, the step of replacing the first header with the second header comprises forming the second header according to protocol information. The protocol information identifies the replacement protocol.

In accordance with another embodiment, the step of modifying the packetized data comprises inserting a third header into the packetized data.

In accordance with yet another embodiment, the step of modifying the packetized data comprises replacing a value of a field of one of the first to third header with a new value.

According to an embodiment of the invention, the field is a destination port number, the value of the destination port number field is a value standardized for the specific protocol of the predetermined protocol stack according to which the input data was packetized, and the new value is a value of a destination port number field standardized for a protocol different from the specific protocol.

According to another embodiment, the computer-readable medium further comprises computer-executable instructions that are adapted to perform the method steps of storing a header configuration of the packetized data including information identifying the replacement, and packetizing subsequent input data according to the protocols corresponding to the predetermined protocol stack and according to the header configuration. Further, the step of packetizing subsequent input data comprises forming subsequent packetized data having at least a part of a header replaced with a replacement.

The method also includes the step of transmitting the subsequent packetized data from the user terminal to the predetermined gateway via the first network node and via the first and second data communication networks.

According to an embodiment of the invention, the step of determining whether the packetized data arrived at the predetermined gateway comprises determining whether a reply message from the predetermined gateway was received at the user terminal.

According to another embodiment, the step of determining whether the packetized data arrived at the predetermined gateway comprises determining whether the reply message was received at the user terminal within a predetermined time period after transmitting the packetized data.

The invention further relates to a computer-readable medium having computer-executable instructions stored thereon, that are adapted to perform, when executed by a processor of a gateway, a method for communicating data to and from at least one user terminal via data communication networks and at least one network node. The at least one user terminal is connected to a first data communication network, while a first network node is connected to the first data communication network and a second data communication network. The gateway, being a second network node, is connected to the second data communication network and a third data communication network. The method comprises the step of receiving, at the gateway, packetized data from a specific user terminal. The packetized data is packetized according to protocols corresponding to a predetermined protocol stack by forming, for each of the protocols of the predetermined protocol stack, a respective data packet including a respective header and a respective payload segment. Further, the method includes the steps of detecting whether at least a part of a first header in the packetized data was replaced with a replacement, and outputting replacement information indicating at least the first header. Another step of the method is depacketizing the packetized data including removing at least one of the respective headers from the packetized data and generating a payload segment according to at least one respective protocol of the predetermined protocol stack. The payload segment is a remaining part of the packetized data after removing the at least one respective header. The method further comprises the step of transmitting a message from the gateway to the specific user terminal, where the message indicates that the packetized data arrived at the gateway. Moreover, the step of depacketizing comprises generating, based upon the replacement information, a specific payload segment according to a predefined protocol of the predetermined protocol stack, where the specific payload segment is associated with the first header.

According to an embodiment of the invention, the first header of the received packetized data corresponds to a header resulting from packetizing data according to a replacement protocol, and the replacement protocol is not comprised in the predetermined protocol stack.

According to another embodiment, the step of depacketizing data comprises removing an additional header from the received packetized data, where the additional header is inserted in addition to the modification to the packetized data.

According to yet another embodiment, the step of receiving packetized data comprises receiving data on at least two network ports, where a first port number corresponds to a value standardized for the predefined protocol and a second port number corresponds to a value standardized for the replacement protocol.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION OF THE EXEMPLARY EMBODIMENTS

Figure 1:
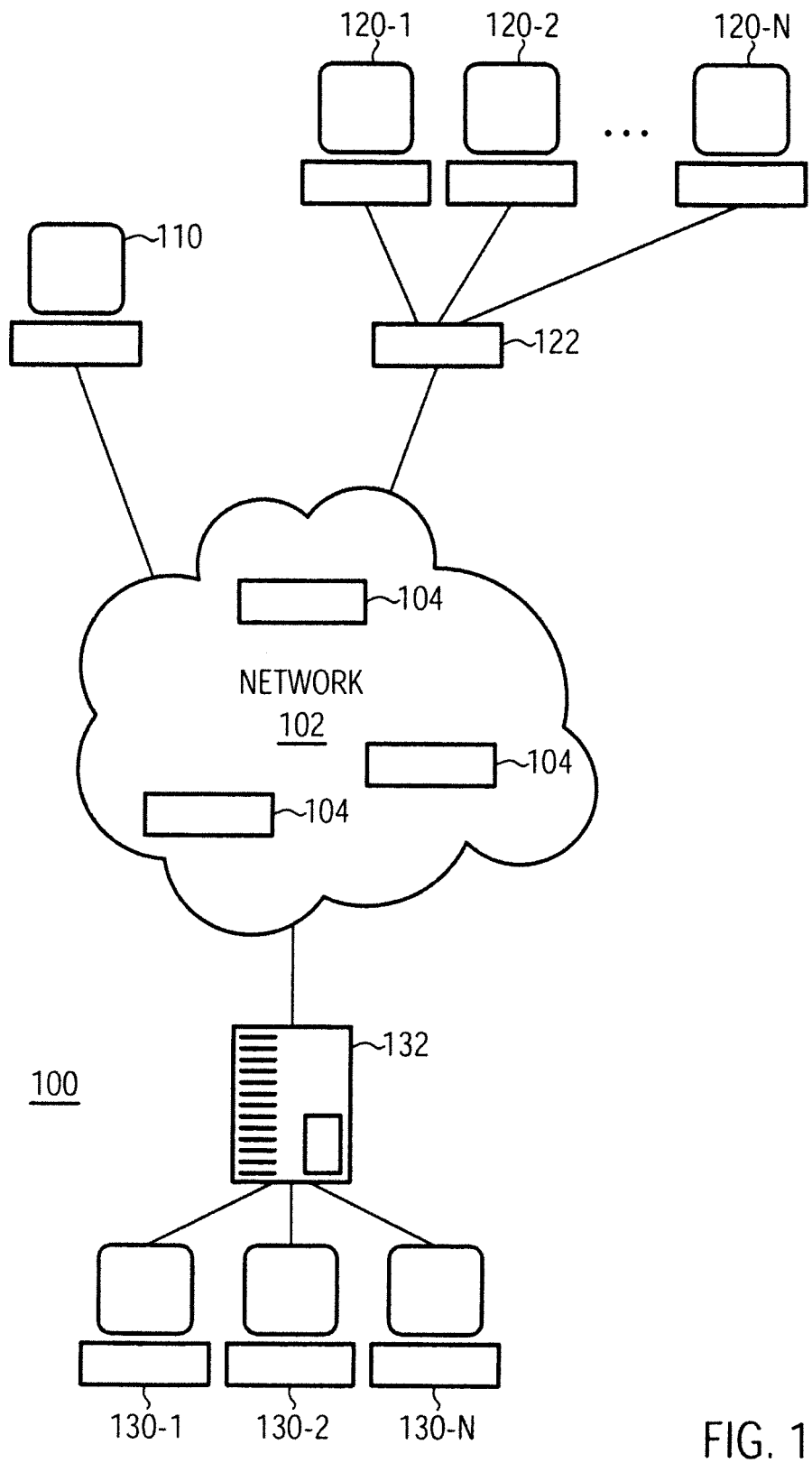
FIG. 1 is a block diagram providing an overview of a system according to an embodiment of the invention.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The invention provides a system, method and computer-readable medium for communicating data between a user terminal and a predetermined gateway via data communication networks and at least one intermediate network node. The invention provides data communication to and from the user terminal and predetermined gateway, taking into account that an intermediate network node may restrict data communications.

The invention may be implemented as client software, server software and/or management software to control secure data transmissions and to establish network access over public networks and the internet. As will be more apparent from the following detailed description the invention provides for an extension of existing local data networks on the basis of end-to-end solutions. According to the invention, any device or application at any location can have remote access via any type of network.

According to FIG. 1, an overall system 100 is depicted which illustrates the interconnection of multiple devices. In detail, FIG. 1 depicts a network 102, which can be any data communication network. For instance, network 102 may be a publicly accessible wide-area network. Alternatively, network 102 may be any cable-based or wireless network. A cable-based network may be a Public Switched Telephone Network (PSTN) and may employ an analogue modem over a telephone line, a modem and a digital phone line, e.g. ISDN, a digital subscriber line (DSL) or a broadband connection via a television cable or via electric power connection. Moreover, a wireless network may employ wireless local area network technology, e.g. WiFi, IEEE 802.11 etc., satellite connections, mobile telephone technology, such as global system for mobile communication (GSM), general packet radio service (GPRS), universal mobile telecommunications system (UMTS), enhanced data rates for GSM evolution (EDGE) etc. It is to be noted that network 102 is not restricted to these exemplary network technologies. Any technology that allows data communications between devices to implement network 102 shall fall into the scope of the invention.

The network 102 comprises a plurality of devices and network connections between these devices. For explanatory reasons, intermediate network nodes 104 are depicted within the network. These intermediate network nodes are capable of receiving data from another intermediate network node 104 or from a device connected to the network, such as device 110 or node 122 which will be explained in more detail below. An example of an intermediate network node would be a bridge, router, switch etc., that receives data and forwards the data to another intermediate network node or to the destination device, such as device 132. An example of an interconnection between intermediate network nodes 104 is the backbone of a public wide-area network.

Further, a first device 110 may connect directly to network 102. For instance, device 110 may be the computer of a mobile worker or a tele-workstation, such as an employee working from his/her home. In such a case, device 110 may establish a telephone connection to another device, e.g. device 132. Further, device 110 is also capable of connecting to a dial-in node of network 102 via an analogue modem over a telephone line. On the other hand, device 110 may also connect to network 102 via a digital subscriber line modem or other broadband modem.

Device 110 may be any type of desktop computing device or mobile device, such as a laptop or a mobile telephone capable of transmitting data via a wireless connection. For instance, device 110 may be a mobile telephone capable of establishing a wireless network connection using the GSM or UMTS technology.

Another device 120 may be connected to network 102 via node 122. It is to be noted that device 120 may also be any type of computing device. As depicted in FIG. 1, a plurality of devices 120-1, 120-2 to 120-N may be connected to the node 122. For simplification of this specification, in the following it will be referred to device 120 to point to all devices 120-1 to 120-N together.

The skilled person will recognize that the devices 120 will have functionality in common, i.e. to establish a connection to node 122 and to communicate via network 102 or with another device out of the group of devices 120. The communication of data involves any available technique of modulating a data signal onto a transmitting medium. For instance, data transmissions may be transmissions of digital data via a cable-based or a wireless communications medium. To communicate digital data it is arranged according to a specific way before transmission. Such arrangement may include the packetization of the data according to one or more protocols. As will be outlined further below, the protocols defining how to process data to be transmitted are referred to as a protocol stack. In general, the packetization of the data includes the addition of transmission parameters to the data. These parameters may be used by intermediate network nodes 104 to determine a route of the data through the network. In other words, the parameters specify information necessary for each device involved in transmitting the data to correctly forward it to the next node in the network or to correctly process the data at a destination node.

Due to the interconnection of devices 120, they build a data communication network via the node 122. For instance, the node 122 may interconnect devices 120 with each other to allow data communications between the devices 120. For example, the devices 120 may be interconnected via network interface cards, such as Ethernet cards, and corresponding cables and thereby form an IP network. Alternatively, the node 122 only allows for routing data transmissions from each of the devices 120-1 to 120-N to the network 102 and back from network 102 to each respective device 120-1 to 120-N. As a consequence, the node 122 builds an intersection of the network of devices 120 with network 102.

According to a preferred version, the node 122 may be a bridge, router, switch etc. Thus, the node 122 can be a simple device which is capable of accessing network 102 and forwarding data to and from network 102. Further, depending on the role or type of the node 122 and its configuration, data may not only be forwarded, but also processed. For instance, the data received can be analyzed to identify source and destination addresses or other information to improve the forwarding capabilities of the node 122. If node 122 would be a bridge, it would process data up to a particular layer of the employed protocol stack, while it would operate on a higher level if it would be a router. This will also be described in more detail below.

Alternatively, the node 122 may be a computing device capable of managing a plurality of network connections. For instance, the node 122 may be a gateway or a proxy device. It is to be noted that the node 122 is not limited to these devices, but rather includes all possible network nodes.

Further, the node 122 may also be seen as an intermediate network node, such as nodes 104, since it provides forwarding functionality as intermediate network nodes 104. On the other hand, node 122 also provides for access to network 102 for at least one device (120). Node 122, when connected to the network 102 may even be interpreted as part of network 102. Thus, the node 122 can also be referred to as an access node, access router or network node. These terms are interchangeable and all refer to node 122 in the following specification.

The devices 120 may be workstations or desktop computers of workers at the firm. A device 120-1 may also be the computer of an employee of another firm who is at a meeting and wants to connect to the network of his/her own company.

According to another aspect, network 102 includes a telephone network, as well as an intermediate network node 104 and an access point 122 provided by a mobile telephone provider. Thus, node 122 is a device managing a plurality of data connections from mobile telephones, e.g. via GPRS or UMTS technology. It is able to route data communications from each of devices 120 to network 102 and back. Access point 122 is therefore part of network 102 to which mobile devices connect when switching into data transmission mode.

Devices 120 would then be mobile computing devices, such as a mobile telephone, a personal digital assistant (PDA) or any computing device, employing wireless data connection technologies, such as GPRS or UMTS. Each of the devices 120 can establish a data connection via the node 122 of the service provider.

In a preferred scenario node 122 may be provided by a specific facility such as a hotel, while devices 120 can be connected to node 122 from each hotel room. Thus, each guest of the hotel may be provided with a cable-based or wireless network connection to the node 122, and hence to the network 102.

In any case, nodes 104 and/or 122 may be configured by its provider to restrict data communications to particular protocols or particular ports. This configuration may be necessary to protect, for example, node 104 or 122 and any device connected thereto against attacks from outside. On the other hand, restrictions may also be useful if the bandwidth of intermediate network nodes 104 or node 122 is not sufficient to allow each device 120 to make any type of data transmission.

The provider of node 122 may restrict data communication to particular protocols. Thus, only data prepared according to particular protocols would be transferred from device 120 to network 102 and back. As an example only, node 122 may restrict the data flow to data packetized according to the Simple Mail Transfer Protocol (SMTP). A further configuration may instruct the node 122 to block any connections employing a file transfer protocol (FTP). A protocol which is more and more in use is the so-called Voice-over-IP (VoIP) protocol which allows telephone calls over the internet. Some service providers, however, have excluded this kind of data from their services. They might block VoIP data at their network nodes (104 or 122). It is to be noted that the scope of the invention is not limited to these protocols, but rather includes all protocols involved in data transmission.

Alternatively, the intermediate network node may be programmed to restrict data communications to particular network ports. For instance, HTTP and HTTPS communications use ports 80 and 443, respectively. Thus, only data packets defining port 80 or 443 as its destination would pass through node 122. It is to be noted that the invention is not limited to these ports. Alternatively, the intermediate network node may restrict data traffic on any other port as well. Further, a restriction is also possible on multiple ports, such as complete ranges of port values.

Referring back to FIG. 1, another group of devices is illustrated. In detail, devices 130-1 to 130-N may be connected to a node, such as a gateway device 132. Again, devices 130 and 132 build a network of computing devices, for example for data communications.

The gateway device 132 may be any network node capable of connecting to at least one other device. Further, the gateway 132 provides for data communication connections between a plurality of devices 130. Thus, gateway 132 may be a computing device that is part of a local area network, e.g. a network within a company.

Gateway 132 may be further capable of connecting to a second network, such as network 102. For instance, gateway 132 may provide one or more links to a wide-area network, such as the internet. Thus, the gateway may provide network access to network 102 for each of the devices 130-1 to 130-N. In other words, gateway 132 may act as a network node between two networks, i.e. network 102 and the network of devices 130.

Alternatively, gateway 132 may be implemented as several devices, such as a computing device and a router and/or a firewall device. In any case, gateway 132 controls any network traffic to and from network 102 and eventually also network traffic within the network of devices 130. Thus, gateway 132 restricts outgoing and/or ingoing data communications. For instance, gateway 132 protects devices 130 from any ingoing data communication originating from network 102. Thus, devices 130 and 132 can be protected from attacks by viruses, computer worms, etc. and gateway 132 acts as a firewall between network 102 and the network of devices 130.

Gateway 132 may also accept secure data connections from device 110 via network 102 or from device 120 via network 102 and via node 122. For example, for establishing a data connection device 110 may use an analogue or digital telephone line to call directly into gateway 132. In addition, device 120 can also establish a data connection, i.e. a data transmission to and from device 132, via the internet. However, the invention is not restricted to a specific cable-based or wireless technology.

According to a further aspect of the invention, gateway 132 provides for authentication of any device which tries to establish a connection to the gateway. As an example, an employee of a particular firm is in a hotel or at a "hotspot", i.e. a public internet access point, and wants to access the firm's network. The employee or user may have a laptop or other mobile computing device 120-1 which is capable of connecting to node 122 provided by the hotel. The device 120-1 may be a user terminal which has been configured by an administrator of the firm. Device 120-1 may then try to connect to gateway 132 via node 122 and network 102. For example, the user may enter a network address of gateway 132 to establish the connection. On the other hand, device 120-1 may be preconfigured by the administrator of the firm and automatically connects to a preconfigured address of the gateway 132.

To establish the connection or a session, device 120-1 would send data via node 122 and the network 102 to gateway 132. Such data communicated to gateway 132 may identify the device 120-1 and/or the user of the device 120-1. It has to be noted that additional authentication or identifying information may also be sent to gateway 132 or exchanged between device 120-1 and gateway 132 in subsequent communications. After authentication of the user and/or the device 120-1, the gateway 132 may send data back to device 120-1 resulting in an authenticated and/or secure data communications connection.

In a preferred aspect, cryptographic keys may be exchanged between device 120-1 and gateway 132 to implement a secure network session or data communication. As is well known in the art, data may be secured by encrypting the entire data or by providing information for an integrity check of the data, such as a checksum of the transmitted data. Such measures are necessary to protect transmitted data from attacks, e.g. a "man-in-the-middle" attack trying to read, manipulate or delete the data.

Alternatively, authentication may involve the exchange of user credentials, such as name and password. For example, the user may enter a user name or email address and a corresponding password. In a further aspect of the invention, the user is provided with a one-time password (OTP) device to enhance security. An even stronger authentication may rely on certificates and/or biometric information of the user. Thus, a Public Key Infrastructure (PKI) using certificates can be established to protect a company's valuable infrastructure and data.

A goal of the security measures used is the establishment of a secure connection from one device to another via an unprotected or public network. In general, after the devices have identified each other and trust each other, they are capable of transmitting data in a secure format that should only be readable by the destination device. For instance, a secure "tunnel" is built between devices 120-1 and 132 through the public network 102. Such a tunnel may be based on different protocols or security techniques. As examples only, the tunnel may be a so-called IPsec-tunnel which is based on internet protocol security (IPsec) or an SSL-tunnel based on Secure Sockets Layer (SSL) technology.

Both tunneling techniques allow for establishing a virtual private network (VPN) tunnel. The purpose of a VPN is to allow communications between applications and/or devices connected to the VPN, without the VPN being aware of the existence of the underlying network technique or without the VPN perturbing other network traffic on the network backbone.

Thus, the technique of the invention provides remote access solutions. The employing of tunnelling techniques, such as VPN, allows the extension of an existing network with inexpensive public transmission media. For example, a company can easily bind computing devices of their employees not working within the network peripherals of the company into the company's network using public networks, such as the internet. This extension of the local network is very secure due to an end-to-end security principle.

According to a preferred version, authentication is performed according to the internet key exchange protocol (IKE). It handles the negotiation of protocols and generates the encryption/authentication keys used by IPsec. The IKE protocol is based on the user datagram protocol (UDP). UDP is a standardized transport protocol and hence the port used as source and target port for the communication is well known. For instance, the port standardized for IKE and UDP is port 500.

As noted above, the following problem may occur at any network node (104 or 122) configured by a service provider, such as the administrator of a hotel or a mobile telephone service provider. In some cases, particular protocol and/or port numbers are blocked by the network node (104, 122). Device 120-1 may not be able to exchange cryptographic keys or provide any data for authentication according to IKE. Thus, if device 120-1 wants to authenticate itself, it would not be able to reach gateway 132, since the network node 104, 122 blocks any data communication on port 500.

Alternatively, the intermediate network node may further restrict data communications. For instance, data according to particular protocols, e.g. the file transfer protocol (FTP) simple mail transfer protocol (SMTP) or Voice over IP (VoIP), may not be allowed to pass through network node 104, 122.

As will be outlined in more detail further below, the invention provides for a method and system to find a path from the client device, such as device 120-1, to a preconfigured network node, such as gateway 132.

Figure 2A:
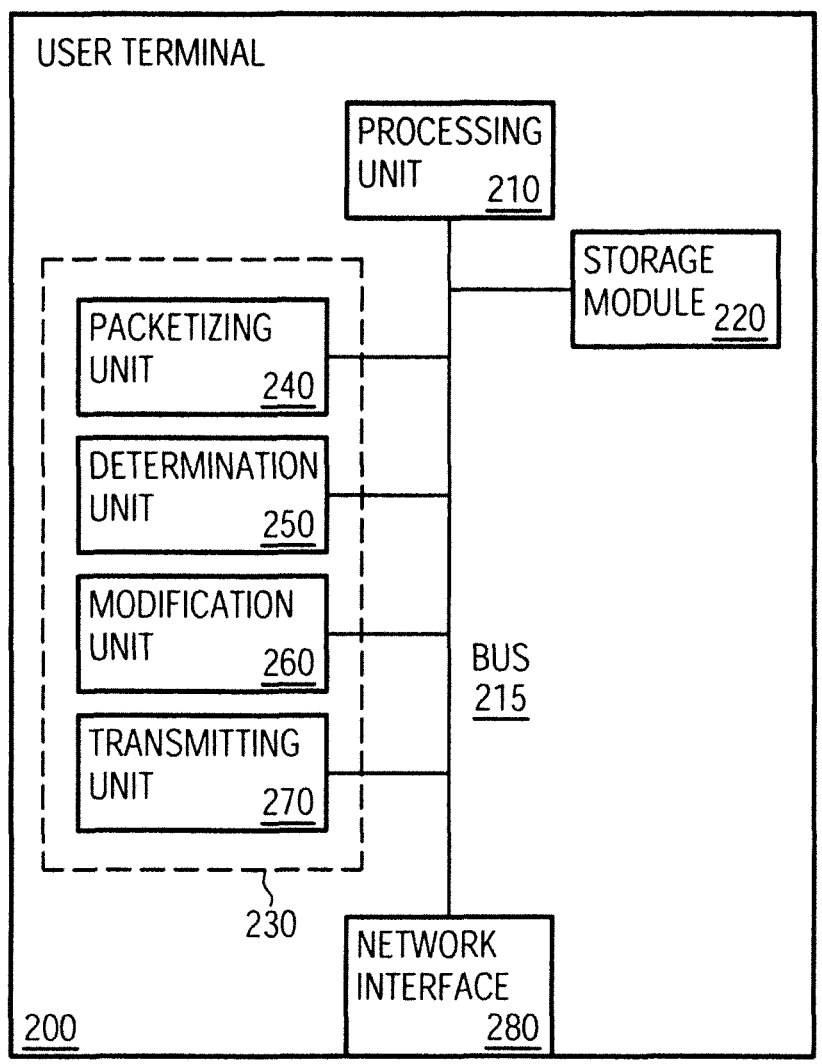
FIG. 2A is a block diagram illustrating the structure of a user terminal according to an embodiment of the invention.

Turning now to FIG. 2, where some of the components and units of a user terminal are illustrated, a user terminal may be any device operated by a user, such as devices 110 and 120 of FIG. 1.

A user terminal in accordance with the invention refers to any kind of device that is capable of communicating data to and receiving data from another device. In detail, a user terminal may be any computing device equipped with some kind of processing unit 210. Further, a user terminal may include a network interface 280 for external data communication. The processing unit 210 may process any kind of data, e.g. computer-executable instructions, while the network interface 280 provides for connecting to a network.

As mentioned above, a user terminal can be any kind of computing device, such as desktop computers, laptops, tablet PCs, netbooks, e-books etc. It has to be noted that the invention is not limited to these computing devices. The user terminal provides the characteristic of connecting to another computer, such as a gateway, and to communicate data via the established connection.

Alternatively, the user terminal is implemented on a mobile device, such as a mobile telephone, a smart phone, a PDA or a mobile digital assistant (MDA), a navigation system etc. Again, the invention shall not be limited to these devices, but includes all computing devices providing the described functionality.

In a further alternative the user terminal would be a sensor or sensor device which provides data measured by a sensor. As an example only, such sensors or sensor devices control or measure particular parameters of a machine and transmit the measured data to a control unit or data collection unit. A further example would be a mobile data collection module, which is capable of requesting and/or retrieving data from at least one sensor and transmits the collected data to a central control unit. With respect to FIG. 1, this central control unit could be device 132, while devices 120 would then represent sensors or sensor devices. In this scenario, a machine or a complete factory including a plurality of machines can be controlled from a remote control unit implementing a secure connection over a public network. In a further example, a worker is collecting data from the sensors and subsequently transmits the collected data from a mobile device to a central data collection unit which may also be remote from the sensors. This kind of data collection may be known from data collection systems for heating systems, electric power meters, water meters etc.

A user terminal may provide a storage module 220 to provide data storage for computer-executable instructions. As will be appreciated by the person skilled in the art, the storage module 220 may be used for any kind of data storage, and shall not be limited to computer-executable instructions. The storage module 220 may be implemented as a hard disk drive, an optical drive, a random access memory (RAM), a read only memory (ROM), magnetic or optical disks, flash drives etc. The invention is not limited to these storage devices, and it has to be noted that any kind of device or medium capable of storing data will be included in the invention.

Alternatively, the storage module 220 of the user terminal may also comprise multiple storage units. For instance, the user terminal may include an internal storage and provides an interface for an external storage. Such external storage may be an optical disc, flash memory card, USB memory device etc.

Further, the user terminal includes a network interface 280. This network interface 280 may be any kind of cable-based or wireless network interface. For instance, network interface 280 may be capable of establishing a connection to network 102 or an intermediate network node 122 (see FIG. 1). Such a connection may be made via a network cable, a telephone line or in a wireless manner. As is well known in the art, a wireless connection to a network or a network node may be based on any kind of wireless networking standard, such as IEEE 802.11 or mobile telephone techniques, such as GSM, GPRS, UMTS, EDGE, etc. Again, the network interface of the invention shall not be limited to any of these techniques, but shall also include other cable-based or wireless standards and technologies.

Referring back to FIG. 2, the processing unit 210, storage module 220 and network interface 280 may be interconnected via a bus 215. As example only, a bus may be implemented as peripheral components interconnect (PCI) bus, or a video electronics standard association local bus (VL-BUS or VLB). The invention is not limited to these buses. Rather, any type of bus interconnecting components inside a computer or computing device to transfer data between the components will fall under the scope of the invention.

FIG. 2 further depicts several units, such as a packetizing unit 240, a determination unit 250, a modification unit 260 and a transmitting unit 270. The functions provided by each of these units will be discussed in more detail further below. Preferably, each of the units may be implemented as computer-executable instructions stored on storage module 220. The computer-executable instructions may be the result of a software installation on user terminal 200. On the other hand, the computer-executable instructions may be located on a removable storage device, such as a CD-ROM, a flash memory card, a Subscriber Identity Module (SIM), a disk or the like and can be loaded into storage module 220 when booting user terminal 200.

These computer-executable instructions will then be loaded and processed by the processing unit 210 to provide their functionality. For example, during execution of the instructions the processing unit 210 may load or instantiate the computer-executable instructions into a random access memory (RAM) (not shown) or any other kind of cache memory.

Alternatively, the packetizing unit 240, the determination unit 240, the modification unit 260 and the transmitting unit 270 may be implemented as an integrated circuit, each connected to the bus 215. In another alternative some of the units are combined into one unit. Even all four units 240 to 270 may be implemented as a single unit as illustrated in FIG. 2 (as dashed line 230). Such a combined unit may be implemented as software, i.e. computer-executable instructions stored on storage module 220 or any other storage device and executed by processing unit 210, or as hardware, such as an integrated circuit (IC). Such an IC may even be integrated in a removable unit, e.g. a SIM-card or other secure data card.

In yet another alternative, the network interface 280 may be included in a network interface card (not shown) which may also provide storage units and a processing unit. With such a network interface, the packetizing unit 240, the determination unit 240, the modification unit 260 and/or the transmitting unit 270 may be integrated into the network interface card. This integration may be either done via hardware or via software. Again, a hardware implementation may include integrated circuits mounted on the network interface card and connected to other components on the card via a bus.

According to a further alternative, some of the units 240 to 270 are included in the user terminal, while the remaining units are implemented on a network interface card. For example, the packetizing unit 240 and transmitting unit 270 may be implemented on the network interface card, while the determination unit and the modification unit are part of the overall user terminal. Again, the invention is not limited to any of such combination, and rather includes any possible allocation of each unit 240 to 270.

Referring to the user terminal, the packetizing unit 240 provides a protocol stack according to which the data will be packetized. The protocol stack may be implemented by the packetizing unit 240. For example, the user terminal may provide particular software applications, modules or objects which implement the functionality of packetizing data according to a respective protocol. For simplification of this specification, FIG. 2 only depicts the packetizing unit 240, but it has to be noted that the packetizing unit 240 refers to the group of these software applications, modules or objects.

Alternatively, parts of the packetizing unit, i.e. some of the software implementing the protocol stack, can also be part of an operating system of the user terminal.

A detailed description of an exemplary protocol stack is provided below with respect to FIG. 2B.

In accordance with an aspect of the invention, the storage module 220 keeps a configuration file or security policy for user terminal 200. Such a configuration file may be set up by an administrator who preconfigured the user terminal 200. Further, the configuration file may be customized by a user of the user terminal via a corresponding user interface (UI). The configuration file or the security policy can be accessed by any of the units 240 to 270. It includes information to control the functions of each unit, e.g. how to packetize data or how to modify packetized data, which will be explained in more detail further below.

The configuration file may be stored on a removable storage medium, such as a flash memory card, a SIM-card, USB-drive or the like. Thus, a user may use any computing device available and can insert or attach the removable storage to configure the device for establishing secure connections. The configuration file may also be encrypted to enhance security. In this case, an application on the user terminal needs to decrypt the file before initiating network communications. Such an application can also be stored on the removable storage, so that the invention can be implemented even on not pre-configured devices.

In addition, the configuration file may also indicate firewall settings for user terminal 200 depending on the available data connections. For example, a dial-in connection using GSM may be regarded as more secure than a WLAN session at a public hotspot. On the other hand, a WLAN session set up at a branch or subsidiary of the company from which the user terminal originates would be rather a secure connection, and the firewall of user terminal 200 may be configured less restrictive.

Figure 2B:
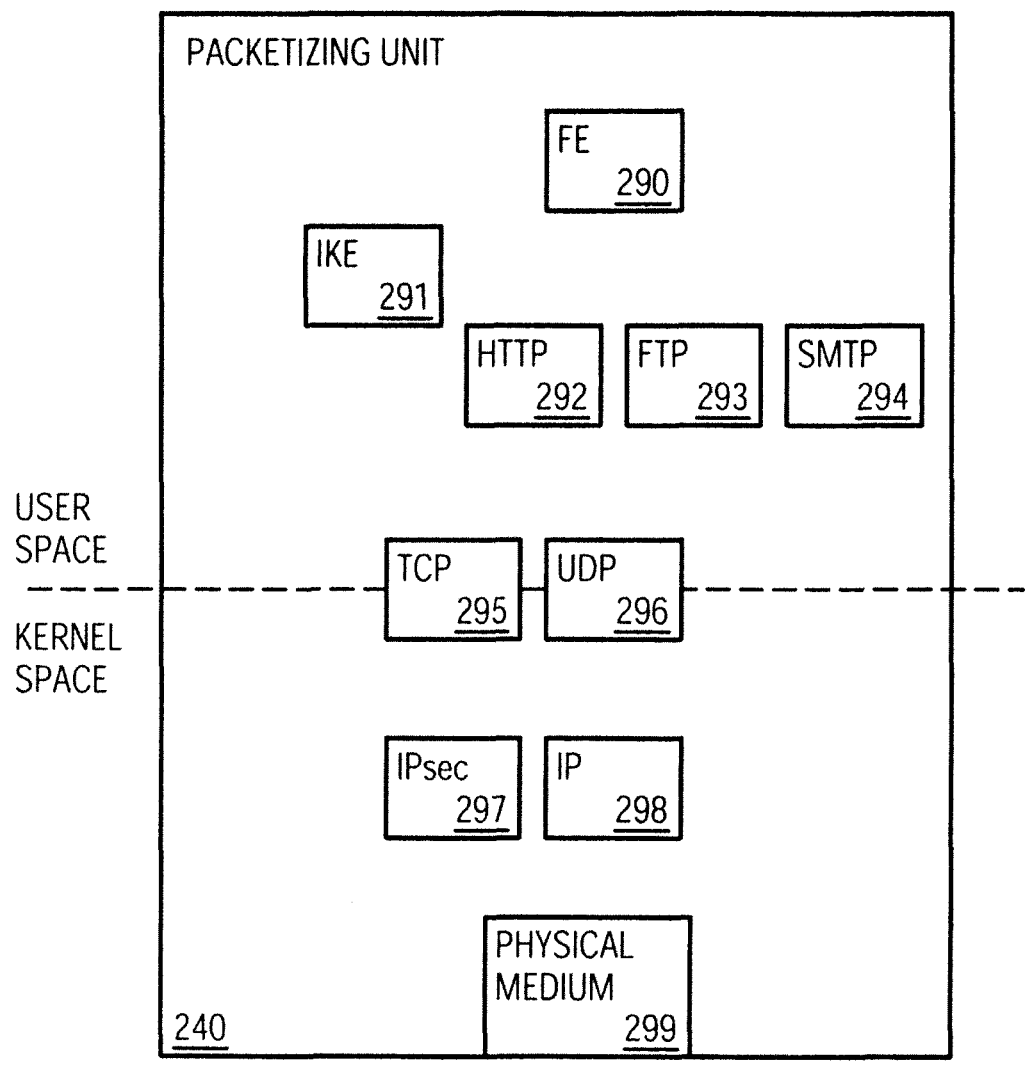
FIG. 2B is a block diagram illustrating the packetizing unit in more detail and illustrating a protocol stack.

Referring now to FIG. 2B, a packetizing unit 240 is illustrated in more detail. It is to be noted that FIG. 2B does not depict a complete protocol stack, but has been reduced to exemplary modules and exemplary protocols for simplification of this specification.

As mentioned above, the packetizing unit refers to a group of particular software or hardware modules/units that are responsible and capable of packetizing data according to a respective protocol. As depicted in FIG. 2B, some of these modules are implemented in user space while others are implemented in kernel space. This allows a stable operation of the more basic, but important modules in kernel space, while other modules can be easily reconfigured or exchanged when in user space.

The packetizing unit 240 may include a particular application or module, such as a proprietary frontend (FE) 290. This frontend 290 is capable of processing and handling data and/or data packets. For instance, the frontend 290 provides an interface for receiving data from one of the other modules. The frontend 290 also forwards data to a particular module for further packetizing. As an example only, data to be sent via a network may be packetized by the HTTP module 292. From there, it will be forwarded to the TCP module 295 which again processes the received data, for example, by adding a TCP header. The data will then be passed to the IPsec module 297 or IP module 298. If the data cannot be sent directly via the physical medium 299, but needs further processing, the module 297 or 298 may pass the data back to the frontend 290 by using the provided interface of the frontend 290. Such a process will be described in more detail below.

To receive data, each of the depicted modules may comprise at least one interface. Such an interface is a programmed reception point for the particular module which can be addressed by another module. A further example would be the establishing of a secure connection to another computing device, such as to a gateway. In this case, the IKE module 291 may create a first message for a handshake with the gateway, where data of the message identifies the user terminal and/or the user of the terminal as well as protocols and/or encryption key techniques that should be employed for the secure connection. The IKE module 291 then forwards the generated data to another module for transportation, such as the UDP module 296. To pass the data to the UDP module 296, the IKE module 291 may use an interface provided by module 296. After processing the received data at the UDP module 296, for example, adding a UDP header to the data, the created data packet can be sent to an interface of the IP module 298. This module 298 again creates a header, supplements the data received from the module 296 with this header and sends the data via the physical medium 299 to the gateway.

As apparent from the above description and FIG. 2B, each of the modules 291 to 298 is responsible for receiving and processing data according to a particular protocol. The protocols may represent alternatives, such as modules 292 to 294 (e.g. HTTP, FTP or SMTP representing protocols of an application layer). Thus, each protocol can usually be assigned to a particular layer within a particular processing order. Data flows through the packetizing unit 240 according to this order. The combination of particular protocols of different layers is referred to as a protocol stack. A plurality of these protocol stacks is standardized, such as the stack of HTTP (292), TCP (295) and IP (298) protocols for internet/web browser data communication.

With respect to the physical medium 299 it has to be noted that this medium may be part of the network interface 280 shown in FIG. 2. It is depicted in FIG. 2B to illustrate that the physical transportation medium can also be part of a protocol stack and usually forms the lowest level of the processing order. In other words, data processed by all modules of a particular protocol stack is finally put onto the transmission medium 299 which typically involves any kind of network interface.

A further aspect of the invention includes the establishing of TCP connections by the frontend 290. In detail, since the modification of the headers includes the use of a TCP connection instead of only sending UDP datagrams, a TCP connection needs to be initiated. As will be appreciated by the person skilled in the art, a TCP data transmission is more complicated than a UDP datagram transmission. Thus, if the frontend 290 will receive data from the IKE module 291 or IPsec module 297, it will determine whether a TCP connection to the destination address has already been established. If not, the frontend will buffer the data received from the IKE module 291 or IPsec module 297 and will establish a TCP connection to the destination address, e.g. a gateway.

To do so, the frontend 290 will instruct the TCP module 295 accordingly to create an end-to-end connection to the gateway. Since the TCP module of the operating system may be used, it will be the operating system which tracks the state of the TCP connection, including any keep-alive of the TCP connection. When the TCP connection is established, the frontend forwards the buffered data to the TCP module 295 for further processing, such as processing by the IP module 298 and sending the data to the gateway via the established TCP connection.

In a further aspect, the establishing of the TCP connection may include the sending of a so-called SYN option. As will be appreciated by the skilled person, to establish a TCP connection the exchange of several messages between the user terminal and the gateway is necessary. For instance, handshake messages including synchronization (SYN) and acknowledgment (ACK) messages will be exchanged. During one of these exchanged messages, the frontend 290 may include a SYN option. This option may be a unique signature value. This unique value can then be detected by the gateway. After detection of the signature, the gateway can be configured to forward any data received via the established TCP connection to another port than the one specified in the TCP header.

For instance, as will be explained further below, data may be sent on the port 443, which usually refers to secure web data communications. Thus, normally data received on port 443 would be forwarded to a web server. If the gateway is configured in accordance with the detection of the unique signature the gateway may forward any data packet received on port 443 to another module, not being the web server. Instead of forwarding, the gateway can alternatively replace the port number from 443 to a different value that identifies the intended module, such as an IPsec module of the gateway.

Figure 3:
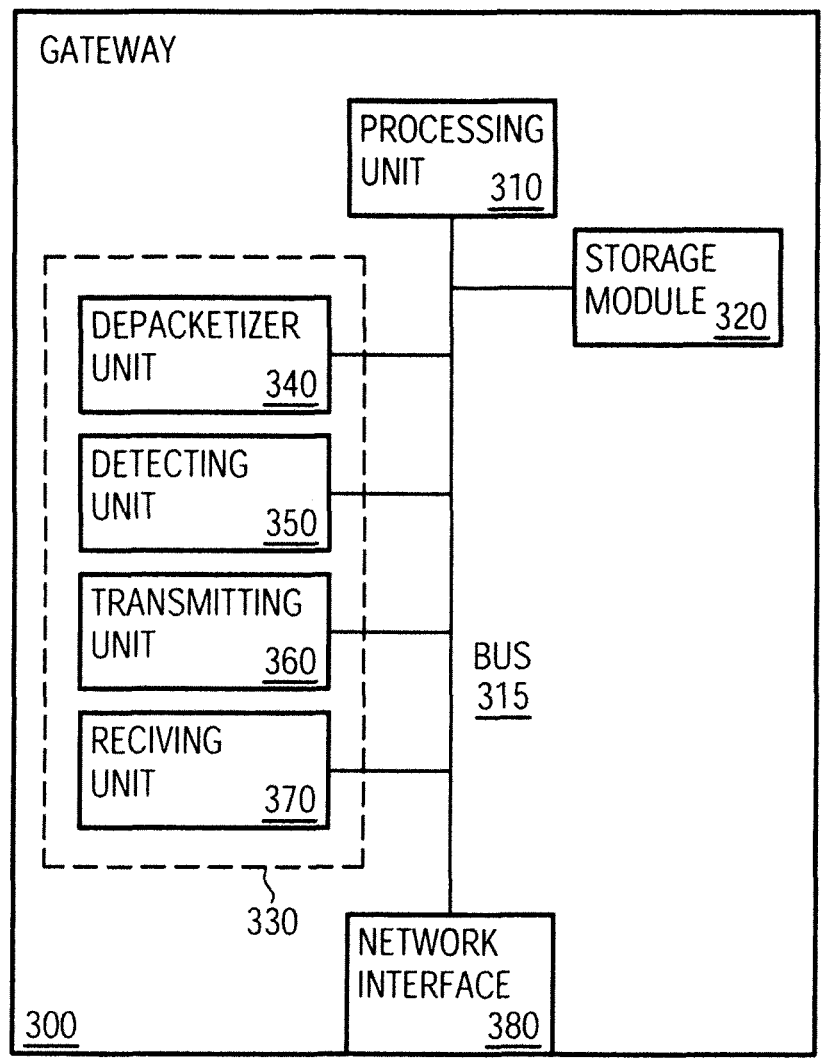
FIG. 3 is a block diagram illustrating the structure of a gateway according to an embodiment of the invention.

Referring now to FIG. 3, a gateway is depicted in more detail, such as gateway 132 depicted in FIG. 1. A gateway may be a network node being a joint connection of two networks, such as gateway 132 depicted in FIG. 1. As noted above, a gateway provides for interconnecting two data communication networks. For instance, it is used to provide access from a private network of a plurality of devices to a public network, such as the internet.

According to a preferred version, the gateway 132 may be a computing device capable of managing a plurality of network connections. Thus, the gateway 132 has some processing power and may also provide storage capabilities as outlined below.

Further, the gateway 132 includes capabilities of a bridge, router, switch etc. In other words, the gateway 132 is capable of forwarding data to another device, such as a server, proxy or another more powerful computing device. Depending on the kind of gateway some data processing may take place. For example, a bridge is capable of processing the data within a data link layer of the protocol stack, while a router would be able to process the data at the network layer.

A further function of a gateway may be seen in the authentication of users or devices trying to access the private network from the outside, i.e. from the public network.

FIG. 3 illustrates a similar arrangement of components as depicted in FIG. 2 for a user terminal. For instance, the gateway 300 provides a processing unit 310, a storage module 320, a network interface 380 and a bus 315 interconnecting these components. In particular, the functionality of the processing unit 310 is similar to that of the processing unit 210 of FIG. 2, as is for storage module 320, network interface 380 and bus 315. Again, these components and bus 315 shall not be limited to the implementations discussed above with respect to FIG. 2.

Further, gateway 300 includes a depacketizer 340 (also referred to as depacketizing unit 340), a detecting unit 350, a transmitting unit 360 and a receiving unit 370. These components 340 to 370 are exemplary components only and shall not limit the scope of the invention. A person skilled in the art will be aware that the gateway 300 may include other components or units than that depicted in FIG. 3. Further, the gateway 300 may even comprise fewer components than illustrated. For instance, the transmitting unit 360 and the receiving unit 370 may be implemented in a different device to which the gateway is connected via the network interface 380.

Again, with respect to the depacketizing unit 340, the detecting unit 350, the transmitting unit 360 and the receiving unit 370, each of these units may be implemented as software or hardware. In addition, these four components 340 to 370 may also be combined in a single component 330. For instance, a single integrated circuit may provide the functionality of each of the four components 340 to 370. According to another aspect, the storage module 320 holds computer-executable instructions, which when executed by the processing unit 310, perform the functionality of each of the units 340 to 370.

As described above for the packetizing procedure, the depacketizing will be implemented via particular software or hardware applications, modules, units or objects, together referred to as the depacketizer or depacketizing unit. Each of these applications, modules, units or objects is responsible for revealing a payload portion of the packetized data according to a protocol of a particular protocol stack. In addition, the corresponding header portion is analyzed to retrieve header parameters that help revealing the payload. The header parameters can also indicate which protocol has been used in the next higher layer, so that the depacketizer can determine to which application, module, unit or object the revealed payload has to be sent or provided to. The data can be forwarded to the next module by addressing an interface provided by the next module.

The network interface 380 may be a cable-based interface or a wireless interface, such as discussed above for the network interface 280 illustrated in FIG. 2. The network interface 380 of the gateway is capable of connecting to one or more computing devices building a first network, as well as to a second network.

Further, the network interface 380 may be capable of linking to a further device, such as a switch or router, which provides the connections to at least two networks.

Alternatively, the gateway 300 comprises more than one network interface (not shown) to provide sufficient physical network connection ports. In particular, the gateway provides at least one public network interface connecting, for example, to public network 102 (see FIG. 1) as well as at least one private network interface connecting to the network of devices 130 (see FIG. 1). On the other hand, the gateway 300 may also include a plurality of wireless network interfaces to allow for connecting of a plurality of computing devices.

According to another aspect, the storage module 320 stores a configuration file or security policy for the gateway 300. Such a configuration file may be set up by an administrator who (pre)configured the gateway 300. The configuration file or security policy can be accessed by each of the units 340 to 370. It includes information to control the functions of each unit, e.g. which data traffic to receive or how to depacketize received data, which will be explained in more detail further below. Other information kept by a configuration file or a security policy may identify user terminals or users allowed to access the gateway and to set up a connection with it.

Figure 4:
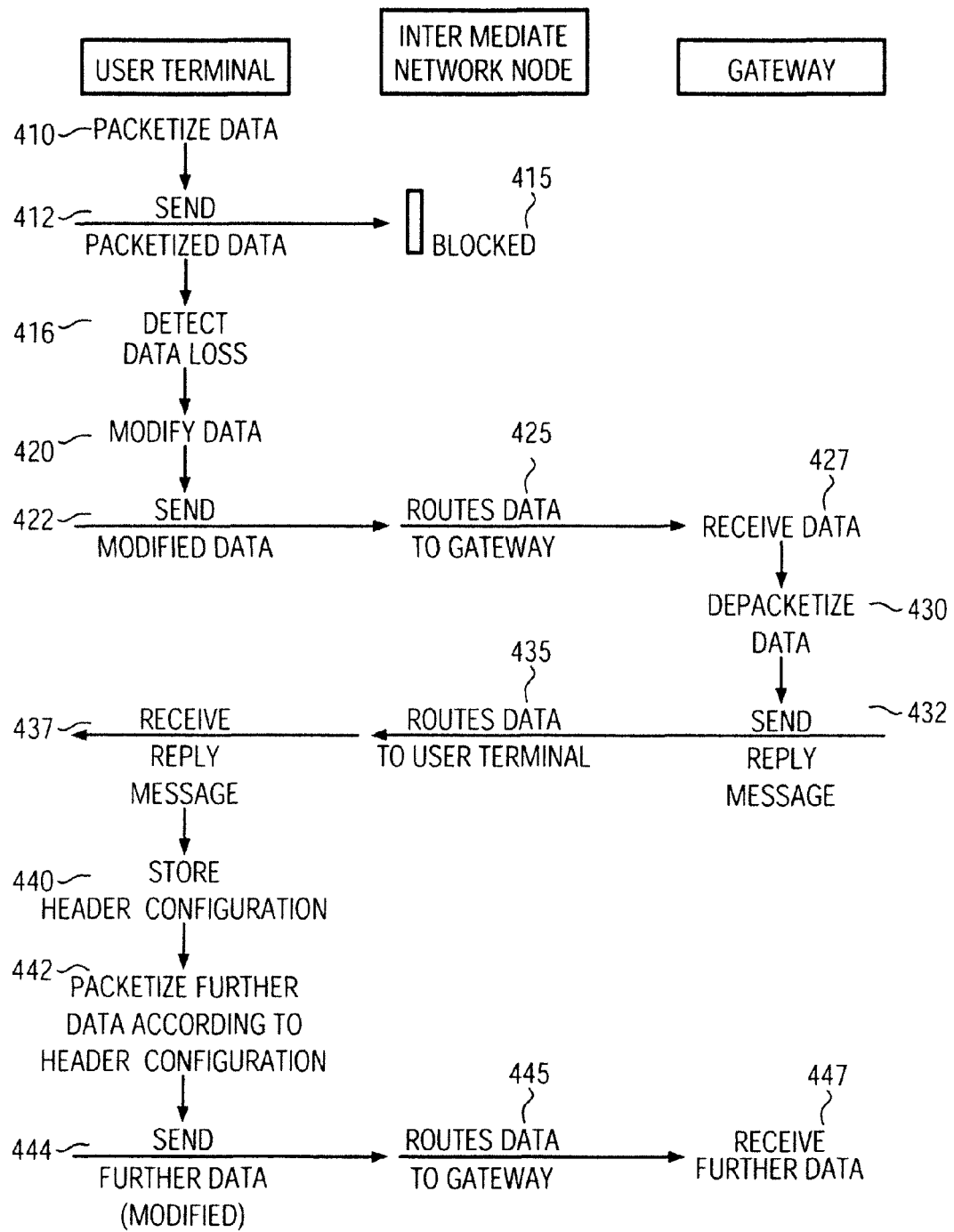
FIG. 4 is a flow diagram illustrating the interaction of a user terminal, a gateway and an intermediate network node according to an embodiment of the invention.

Referring now to FIG. 4, an exemplary procedure is illustrated on how the user terminal (120, 200), the network node (104, 122) and the gateway (132, 300) interact. As mentioned above, the user terminal 200 may be one of the devices 120-1 to 120-N of FIG. 1. The network node 104, 122 may be a network node provided by, for example, a hotel administrator. The gateway 300 may be provided and controlled by an administrator of a company to which the user of the user terminal is allowed to gain access.

To establish a connection from the user terminal to the gateway, the user terminal generates initiation data. As is known in the art, particular transmission techniques involve packetizing of data to be transmitted. Thus, the user terminal may packetize data at step 410 before sending it to the gateway.

In general, the packetizing of data includes generating a data packet comprising a header and at least a part of the data in a so-called payload. The header defines parameters of the data within the payload.

As mentioned above, the packetizer of the user terminal provides a protocol stack. For each protocol of the protocol stack, a header is added or supplemented to a respective payload portion forming a data packet. After the first header has been supplemented, this data packet will be provided to the next level of the protocol stack, i.e. the data packet is provided to the software or hardware implementing the next protocol. The data packet will then again be supplemented with another header corresponding to the next protocol of the protocol stack, and so on.

Therefore, a packetizing act according to a specific protocol of the protocol stack handles a payload and the adding of a header. However, the procedure does not need to be aware that this payload may already include a header of a protocol of another layer. Well-known headers and protocol layers are the transmission control protocol (TCP) and the internet protocol (IP). This includes the IP protocol version 4 (IPv4) and version 6 (IPv6). These protocols represent the transport and network layers of the seven layer OSI model. The packetizing will be discussed in more detail below with respect to FIGS. 5 and 8.

Referring back to FIG. 4, if the data has been packetized, i.e. it has been processed for each protocol of the protocol stack, the user terminal sends the packetized data on the above mentioned transmission medium, such as a cable, (step 412). The packetized data may include a destination address, for example, a network address, such as an IP address, of the gateway. Alternatively, a uniform resource locater (URL) may be used to address the gateway.

As is apparent from FIG. 1, the user terminal 120 may be connected with network 102 via the nodes 104, 122. At least one of the nodes may be configured in a particular manner, where packetized data will only be allowed to pass through if it fulfils particular requirements. Such a requirement may be that only HTTP related packets are allowed to pass through the node. All other network traffic will be blocked (step 415) by the node.

Thus, the node may block (step 415) any packetized data depending on the protocols involved in the protocol stack, the port numbers used and/or the applications involved in sending the packetized data. For instance, the node may be capable of analyzing the headers of the packetized data to determine parameters contained in the headers. As examples only, the parameters may define protocols used, source and destination addresses and ports, encryption techniques used, checksum information on the data, the length of the payload etc. Further, the headers and parameters which can be processed depend on the type of node. For instance, as outlined above with respect to FIG. 1 a bridge may only operate on the data link layer, while a router operates on the network layer. On the other hand, depending on the role of the node, operations on each header, up to an application layer, can be performed by the node. For example, a node may play the role of a filter or firewall and hence needs to operate on header data or header parameters of a layer higher than the network layer.

Based on the determination, the node can decide which packetized data will be routed from one network to another network. A reason to block network traffic at the node 122 may be security issues. The less data traffic is possible, the higher will be the chances of averting an attack. Further, blocking network traffic may also reduce the amount of data sent and received. For instance, if a plurality of user terminals shares a particular bandwidth provided by the node, blocking particular data types may increase the overall service experience of the plurality of user terminals.

In a preferred version the node (104, 122) only allows packetized data to pass if they are sent via TCP and port numbers 80 or 443. As is known in the art, port numbers below 1024 are the so-called well-known ports, and are standardized for particular protocols or applications. Port numbers 80 and 443, for example, are standardized port numbers for HTTP and HTTPS protocols, respectively, which are based on TCP. Thus, the node filters data traffic formed according to other protocols, but the invention is not limited to a particular protocol of the protocol stack.

If the user terminal tries to send packetized data using a different protocol than TCP, the node will not route such packetized data, but block the packetized data. As an example only, the user terminal may implement the user datagram protocol (UDP) which is dependent on the standardized port number 500. Such a packetized data will be filtered out (step 415) by the node.

Continuing with the process of FIG. 4, the user terminal is capable of determining whether the packetized data arrived at the gateway. For example, according to an aspect of the invention, a gateway will send a reply message or a response message in case it has received any data from a user terminal. Alternatively, the gateway will send a reply or response message only during the setup of a connection or data transmission session between a user terminal and the gateway. Nevertheless, to allow for setting up a session for data transmission, the gateway will respond to the first received packetized data from a user terminal.

Thus, assuming that the gateway has never received the packetized data, a secure connection cannot be established by the user terminal and the user will not be able to continue working.

To avoid this, the user terminal may provide a detection mechanism to determine whether data was lost somewhere in the network 102. For instance, the determination unit 240 depicted in FIG. 2 may comprise a timer, which is started by a signal indicating that packetized data has been sent at step 412. Such a signal may originate from the transmitting unit 270 and is delivered to the determination unit 240 via the bus 215 (see FIG. 2). If the timer reaches a particular threshold, e.g. 3 seconds, a timeout event may be triggered by the determination unit 240 (FIG. 2). In other words, the determination unit 240 is capable of outputting data indicating that the packetized data did not arrive at the gateway.

Further, any unit or application of the user terminal 200, such as the modification unit 260, can register to timeout events and will hence be informed of a triggered event. The processing unit handles every event and notifies each component or unit that has previously registered to an event. It is to be noted that the timeout event may be triggered after a time greater than 3 seconds or less than 3 seconds. The threshold for the timeout may be set by an administrator, for example, within the configuration file or security policy for the user terminal 200.

In a preferred version of the invention, the timer is set to a particular time, e.g. 3 seconds, and counts down to 0. If, within this time period, no response message has been received, it is detected, for example by the determination unit 240 (see FIG. 2), that the sending of the packetized data failed.

In a further alternative, the same packetized data is re-sent to the gateway and the timer is started again. Thus, the sending of the packetized data can be retried until a response message from the gateway is received. Further, after a particular number of retries, the process may be aborted and it will be determined that the data cannot be sent to the gateway. The number of retries and the amount of time for the timer may be specified within the configuration file or security policy for the user terminal 200. These parameters may be pre-configured by an administrator or adjusted by the user of the user terminal, e.g. employing a graphical user interface or other user interface. Thus, the user is able to adjust these parameters, if he or she experiences that the connection could be established if more retries or a longer time period would be employed. On the other hand, the user may shorten the time period or reduce the number of retries to accelerate the overall connection establishment process.

Referring back to FIG. 4, when it has been detected that communication data is lost (step 416), it is assumed that the data was not received at the gateway. In detail, if the timer and/or number of retries indicate a data loss, there is a high chance that the gateway has not received the packetized data sent at step 412 and re-sending modified data is necessary.

The invention provides a solution to the problem, where a network node blocks the transmission of data. According to a preferred version, packetized data will be modified and re-sent. The modification may include the header portion of the packetized data. For example, a part of a particular header within the packetized data may be replaced. Alternatively, a complete header may be replaced with a new header to provide modified packetized data. Moreover, more than one header of the packetized data can also be modified.

Thus, at step 420, the data is modified, which will be described in more detail below with respect to FIG. 6. The modified packetized data will then be sent (step 422) to the gateway via the network. At step 422, the node routes the modified packetized data to the gateway, which receives the data at step 427.

Alternatively, the user terminal may also scan through a plurality of ports to seek for a port that is "open" at a node. In other words, instead of trying to send particular data to the gateway, the user terminal may send simple network requests to a well-known host. For instance, a plurality of so-called "pings" using different port values may be sent to a host to detect a port that is available, i.e. a port that is not blocked at the intermediate network node.

If an open port is detected, the packetized data is modified in that the destination port value is replaced. Alternatively, the protocol according to the detected port is determined, e.g. using a list of well-known port numbers. The packetized data is then modified in that a header according to the determined protocol is generated and used to replace a complete header of the packetized data. In a further alternative, the data is newly packetized, where the protocol stack has been adapted to include the determined protocol. Another alternative would be the replacing of a header and subsequent exchange of the port number. It is again to be noted that the invention is not limited to any of these alternatives, but may also include combinations thereof.

Further, the node may again block the already modified packetized data. In this case, the steps 416 to 422 will be repeated by the user terminal until the data will be successfully sent to the gateway. In other words, the user terminal will try to modify the data as long as the packetized data assumingly does not arrive at the gateway.

In this way, the user terminal is capable of finding a "path" to the gateway. Such a path may be defined by the protocols used, the port numbers employed or any other header specific data which may be the reason for the blocking of the packetized data by the intermediate network node.

Alternatively, the user terminal may be preconfigured to only send modified data. For instance, the configuration file may include an indicator that controls steps 410 to 420 of the user terminal. If the indicator, e.g. a flag, is set, the user terminal may packetize data according to step 410 and immediately modify the packetized data before sending it to the gateway. If a user has experienced that the packetized data will not pass multiple times, he/she may set the flag in the configuration file to skip steps 412 and 416 at the user terminal for future connections.

If the configuration of the user terminal indicates skipping steps 410 to 416 on the user terminal, the data to be transmitted may be packetized in a manner so that the modifications are already included. This will save time and processing resources.

Referring now to the gateway, it will listen to all kinds of incoming network traffic to be able to receive any data which arrives at step 427. For instance, a plurality of user terminals may try to connect to the gateway using different standards and, thus, different packetizing protocols or network port numbers. The gateway "listens" on at least two network ports to allow differently configured user terminals to communicate with the gateway. The gateway is able to receive data via all possible combinations of standards or packetizing parameters.

If the gateway receives data from a user terminal, it will detect modifications made to the packetized data. For instance, the packetized data is analyzed or parsed and it is determined whether information, such as headers or header fields, does not correspond to a particular protocol stack. The gateway may therefore detect that a user terminal modified the packetized data to send it to the gateway. If such detection has been made, the gateway stores corresponding information for this particular user terminal and it will modify its depacketizer 340 accordingly.

At step 430, the gateway depacketizes the received data and further processes the data. The depacketizing of the data is the opposite procedure as described with respect to the packetizing of data performed by the user terminal. In general, the depacketizing of the data starts with removing the last header added while packetizing the data. For instance, with respect to FIG. 8, the header referred to as "#N" would be removed from the packetized data. The remaining part of the packetized data, i.e. the data segment and headers "#1" to "#N−1" will be provided to the next higher layer of the protocol stack. Then, the second header would be removed in accordance with the corresponding protocol and the payload according to this protocol would be provided to the next higher level of the protocol stack. This procedure will be performed until the last header #1 has been removed and the original data has been revealed for further processing.

Continuing with the procedure illustrated in FIG. 4, the gateway will generate and send a reply or response message to the user terminal at step 432. It is to be noted that any message can be send from the gateway in response the reception of a message from a user terminal. For example, the reply message can also be an acknowledge message of a so-called SYN-ACK message exchange at the establishing of a TCP connection. Alternatively, if the user terminal tries to establish a virtual private network (VPN) connection with the gateway, a particular protocol will be used for authentication of the user terminal. This authentication protocol can be the internet key exchange (IKE) protocol. This IKE protocol also involves a handshake between user terminal and gateway, including the exchange of encryption/authentication keys.

The gateway may thus determine that the depacketized data is a first message of the handshake to initiate a session by the user terminal. In this case, the gateway may generate encryption and/or authentication keys and send those keys back to the user terminal with a reply message at step 432. The sending of the reply message will again include packetizing of the message according to a protocol stack in a similar manner as described with respect to the user terminal.

According to FIG. 4, the message sent by the gateway will be routed by the nodes 104, 122 to the user terminal (step 435). In other words, the reply message will pass through all intermediate network nodes. The gateway uses the same protocols, and/or port numbers as have been used by the user terminal when sending the (modified) packetized data. This setting, i.e. using the same protocol stack and/or modifications as the user terminal, will ensure that the acknowledgment message can pass through any intermediate network node.

The determination unit 240 of the user terminal (see FIG. 2) may now determine whether data has been received. In this case, no timeout event would be triggered and no retry would be necessary, since a path to the gateway has been found, or is available.

When the user terminal receives the reply or response message at step 437, it will store a header configuration (step 440).

The header configuration may be stored in the storage module 220 (see FIG. 2) or any other storage device, such as a random access memory of the user terminal. It may also be stored in the configuration file of the user terminal discussed above. The header configuration provides information on how the packetized data has been modified in the last step of modifying 420. If no modification was necessary, for example if at step 412 the first packetized data was successfully sent to the gateway, the header configuration will store an indication that the default configuration should be used. Further, the header configuration may include data indicating which protocol should be used. On the other hand, the entire list of protocols of the protocol stack may be stored within the header configuration to indicate which header details should be set when packetizing data. Alternatively, the header configuration stores information regarding the port number and/or the protocol of a specific header which differs from the default settings.

According to a further alternative, the header configuration is not stored separately, but the protocol stack itself will be modified. In this case, storage resources can be saved.

Referring back to FIG. 4, at step 442, subsequent data to be sent to the gateway will be packetized according to the protocol stack and/or according to the header configuration. At step 444 the subsequent packetized data will be sent to the gateway. Due to the header configuration, the packetizing will result in a header portion of the packetized data which corresponds to the modified data at step 422, i.e. the successful configuration.

Finally, at step 445 the nodes route the subsequent packetized data to the gateway which receives it at step 447.

Figure 5:
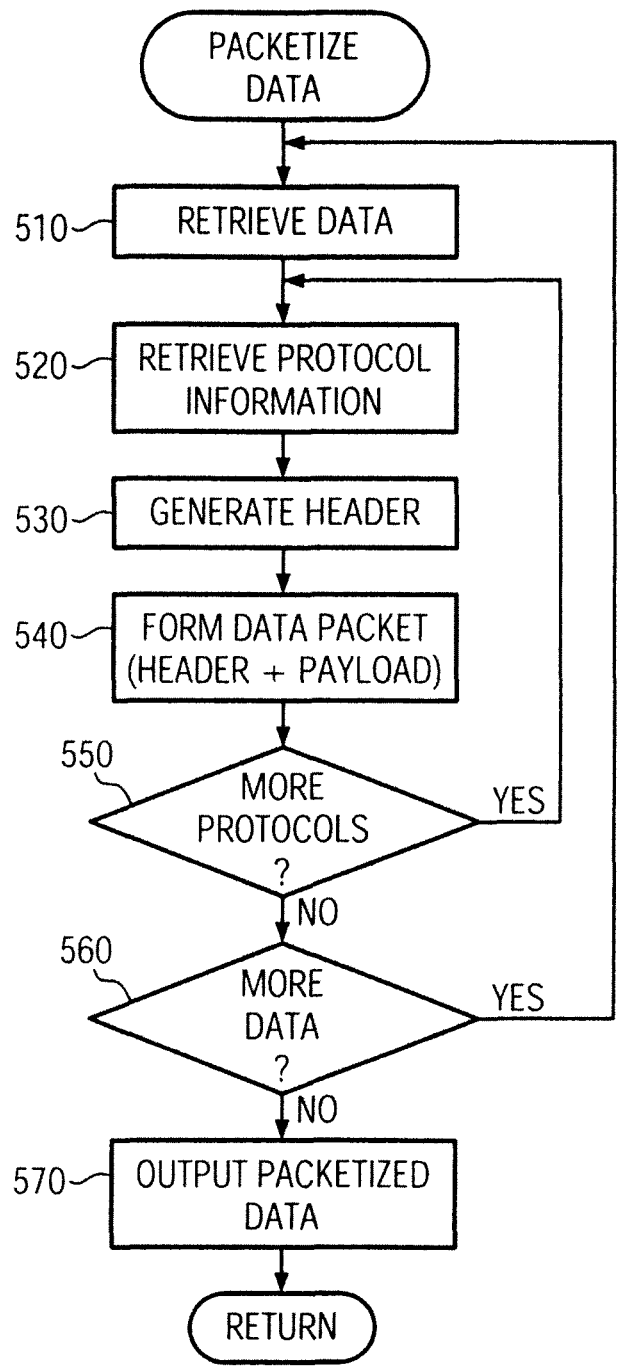
FIG. 5 is a flow diagram illustrating a method of packetizing data according to an embodiment of the invention.

Turning now to FIG. 5, the method step of packetizing data (see steps 410 and 442 in FIG. 4) will be discussed in more detail. The forming of packetized data will be performed on the user terminal, for example by the packetizing unit 240 (see FIG. 2). It is to be noted that the gateway will also packetize data when sending data back to a user terminal. Thus, the following method steps discussed with respect to FIG. 5 may also be implemented by a unit or component of the gateway.

The packetizing unit will first retrieve data at step 510 which needs to be packetized. In accordance with an aspect of the invention, the packetizing unit may request the data from a buffer. Alternatively, the packetizing unit will retrieve the data from another component, such as the processing unit 210 or the modification unit 260 (see FIG. 2), as will be further outlined below. In addition, the packetizing unit may receive data to be packetized from an application running on the user terminal.

At step 520, the packetizing unit further retrieves protocol information. For instance, the packetizing unit may have access to a predetermined protocol stack. The protocol stack may be provided by the packetizing unit itself, an operating system of the user terminal or it may be implemented on the network interface 280 or any other component being responsible for protocol management. Alternatively, a third party application provides the protocol stack as well as further protocols which may be exchanged with one or more of the protocols of the predetermined protocol stack.

As mentioned above, the protocol stack is a combination of protocol implementations for particular layers of a data handling architecture, such as the well-known OSI model. Each protocol can therefore be implemented by a particular component, module, unit, component or object, such as an object of an object-oriented programming instance (see FIG. 2B). These components, modules, units or objects, together referred to as the packetizer, provide the functionality of packetizing data according to the respective protocol. Thus, they are able to retrieve data and process the data according to the protocol to then output the processed data, i.e. packetized data.

Thus, if it is referred to a protocol stack, the skilled person is aware that a plurality of components, modules, units or objects is involved, which process data in a particular order according to the protocol stack order. In other words, if one component, module, unit or object has processed the data, i.e. has formed a data packet, it will provide this data packet to the next component, module, unit or object defined by the protocol order of the protocol stack.

In a version of the present invention, the order of the protocol stack is specified by a configuration or setting of an operation system of the user terminal. Alternatively, the information on the protocol stack may be specified by a configuration file of a third party application or it may be provided by a network interface card which provides its own protocol stack and processing unit.

For instance, the protocol stack is implemented by an application, such as a third party application for establishing secure connections, e.g. VPN tunnels. In this case, the protocol stack of the operating system or any other component of the user terminal will not be used, but the third party application is responsible for packetizing data and forming corresponding headers which allow the data packet to be sent via a network. The third party application may also use protocol stack components of the existing protocol stack (e.g. of the operating system), but may also employ its own components for particular functions. Such a third party application is further capable of modifying the header portion of the data in a particular manner and thereby providing different protocol stacks for different data or a protocol stack together with multiple modification possibilities. As a result, a data packet can be output which can correspond to a standardized protocol stack, such as the one of the operating system, but it can also correspond to a proprietary protocol stack leading to a proprietary header configuration.

With respect to a further aspect of the invention, the protocol stack may be defined by information stored in the above discussed configuration file. In this manner, an administrator can control which protocols are available and which protocols will be implemented by the user terminal. Further, the configuration file may also indicate which protocols to employ depending on security issues, such as the trustworthiness of the network to which the user terminal is connected.

With the data and protocol information, the packetizing unit can generate a first header at step 530 for a particular payload. The header and the payload are then used to form a first data packet at step 540.

For instance, steps 530 and 540 may be performed by a particular component, module, unit or object, while the packetizer or operating system controls the overall procedure, such as flow of data during packetizing at multiple layers.

Figure 8:
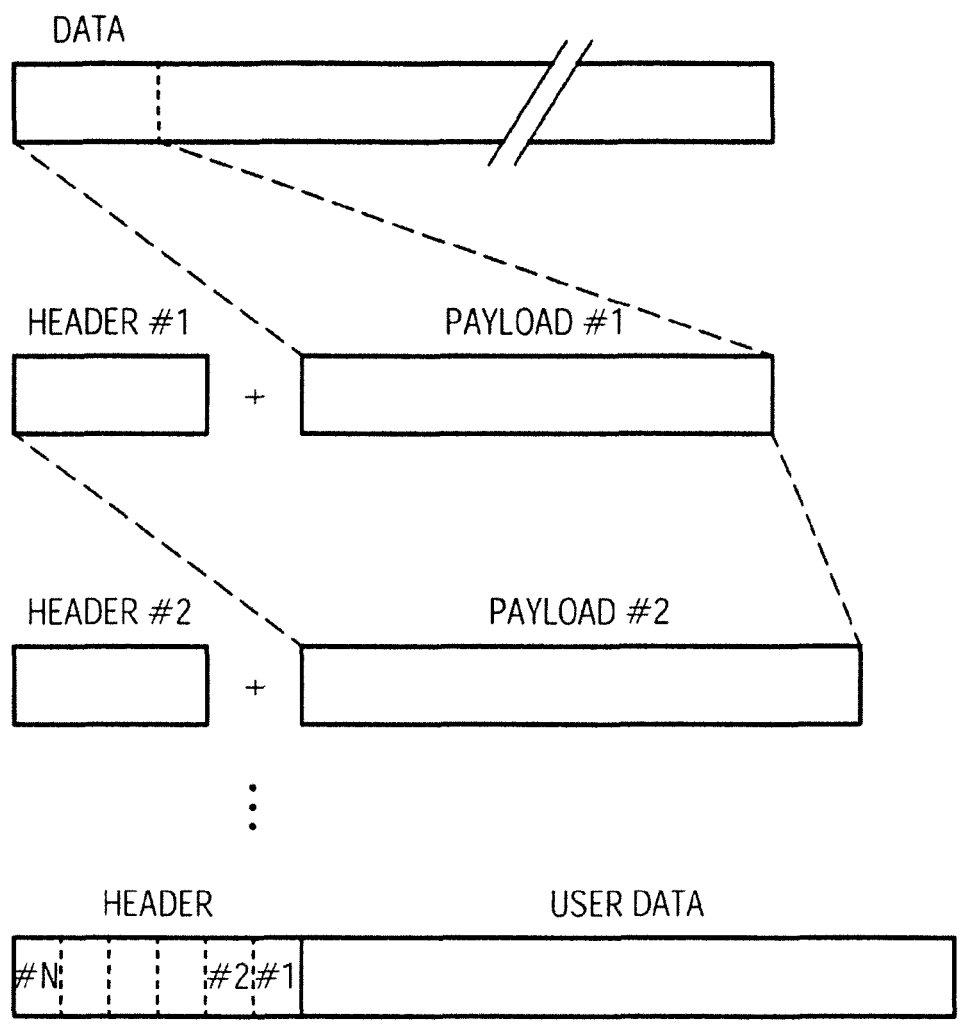
FIG. 8 illustrates the internal structure of data packets during the method of packetizing data according to an embodiment of the invention.

Referring to FIG. 8, the packetizing of data is illustrated in more detail as used in a packet oriented transmission. At the top of FIG. 8, a certain amount of data is depicted. A segment or portion thereof also referred to as user data will be used as a payload to be packetized. For instance, as the data usually cannot be sent within one data packet, the block of data needs to be segmented into pieces of a particular size. The size of these data segments may depend on the protocol used for transporting the data. For instance, some protocols only allow a specific maximum size for the overall data packet. Thus, the packetizing unit may segment the data according to the protocol and form a payload for a first data packet. Alternatively, the packetizing unit will be provided with data segments, for example from a buffer, where the data segment size already corresponds to the possible payload size.

Depending on the protocol, the header number 1 (referred to as "#1") will be formed and supplemented to the payload to make up the first data packet. The combination of the first header and the first payload will be referred to as a data packet which is provided to the next layer of the protocol stack.

A header of a data packet carries control information which is data the network needs to deliver the user data. The header information includes, for example, source and destination addresses, error detection codes like checksums and sequencing information. The invention is not restricted to this control information, but rather includes header information according to each protocol. Some of the control information may also be found in trailers at the end of the data packet, i.e. after the payload portion carrying the user data.

Referring back to FIG. 5, the packetizing unit determines at step 550 whether more protocols are available in the protocol stack. If yes, steps 520 to 540 will be repeated. Alternatively, not all of the steps 520 to 540 will be repeated. For example, in a particular implementation, only steps 530 and 540 for generating the header and forming a data packet will be repeated. In such an implementation, the protocol information does not need to be retrieved and the flow of data through the components for each protocol is controlled by an application.

The repetition of steps 520 to 540 will take place until the last protocol from the protocol stack has been processed. In other words, the retrieved data (step 510) has been supplemented with a header for each protocol of the protocol stack.

Again with respect to FIG. 8, the payload for a particular protocol of the predetermined protocol stack will include the user data and the header(s) from each protocol that has already been processed. Finally, packetized data includes the user data and a number of headers supplemented to it. FIG. 8 depicts up to N headers. The number of headers will depend on the protocol stack and is not limited to any specific number.

According to a version, the method may now output (not shown) the packetized data including the headers of all protocols and send it via the network. The output may take place using a bus structure, such as bus 215 of FIG. 2. The packetized data may either be output to a storage module or provided to another unit for further processing and transmission over the network.

Alternatively, the packetized data is output into a buffer after step 550 (not shown), so that a network interface component can start transmitting the packetized data if the buffer has been filled to a predetermined threshold.

With respect to FIG. 5, after generating the first packetized data, the method may continue with step 560, where it is determined whether more data is available. If yes, the method returns to step 510 to retrieve more data. Again, steps 520 to 560 will be repeated until the data has been packetized according to the complete protocol stack.

If it is determined at step 560 that no more data is available, the complete packetized data is output at step 570. For example, the packetized data may be output to a buffer of a network interface component to be transmitted via a network connection.

As will be appreciated by the skilled person, each of the above discussed outputting possibilities has its advantages and disadvantages. For example, a user terminal having small processing resources may be more efficient by packetizing the complete data before transmitting the data. On the other hand, the buffering of the data consumes more storage resources which may be disadvantageous with devices having only a small storage module. In this case, it would be more advantageous to instantly transmit a data segment after it has been packetized.

It has further to be noticed that the invention is not limited to any of the above discussed outputting procedures. The invention rather includes any possible combination of packetizing and outputting packetized data.

Figure 6:
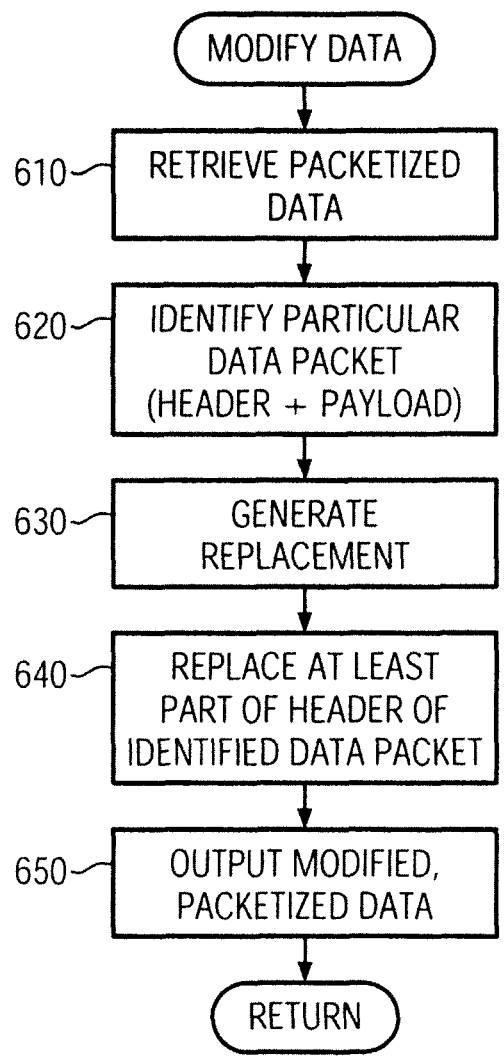
FIG. 6 is a flow diagram illustrating a method of modifying data according to an embodiment of the invention.

Turning now to FIG. 6 illustrating the modification of the packetized data, the modifying was briefly outlined above with respect to FIG. 4 and step 420. The data modification begins with step 610, where packetized data is retrieved, for example at the modification unit 260. The packetized data may be retrieved from a storage component, such as the storage module 220. The packetized data may also be received from a transmission buffer memory of the user terminal or its network interface.

The retrieved packetized data will then be processed to identify a particular data packet at step 620. Alternatively, only a specific header is identified within the packetized data. As outlined above, a data packet includes a specific header and a payload portion, whereby the specific header has been formed according to a specific protocol of a predetermined protocol stack.

Identifying a data packet or a header may include analyzing or parsing the packetized data to determine the bit positions within the binary data at which the particular header and/or the data packet begins and ends. Identifying may also include determining any fields of a header and retrieving a value stored in the field, i.e. a parameter of the header.

With respect to a preferred aspect, the data packet identified is a packet formed according to a particular transport protocol of the protocol stack. Further, the transport protocol can be the UDP-protocol. The identified data packet therefore includes a so-called UDP-datagram comprising a UDP-header and UDP-data. A UDP-header may include a source port, a destination port, the length of the data packet (including the data and the header) and a checksum filed.

Thus, this specific data packet and specific header may result from the internet security association and key management protocol (ISAKMP) employing UDP. As noted above, ISAKMP will also have a standardized (well-known) port number, in this case 500. The identifying of the data packet and/or the specific header may therefore reveal that the identified packet is for establishing a secure network association between a user terminal and a gateway.

Referring back to FIG. 6, a replacement is generated at step 630, and at step 640 at least a part of the specific header of the identified data packet will be replaced with the generated replacement.

According to an aspect, a possible replacement is a new destination port value. Nevertheless, any field of a header may be the target of the modification, i.e. the value of this field is replaced by a new value. For instance, a field of an IP-header may be replaced, such as the destination IP address field and/or the protocol ID field.

The replacing of at least a part of a header may be made by changing the corresponding binary value at the correct bit position within the header portion of the packetized data. Thus, the packetized data would not be in conformance with the protocols of the predetermined protocol stack anymore. Alternatively, the data is modified by newly packetizing the data according to a modified protocol stack. In this case, the protocol stack may not be in conformance with a standard protocol stack.

The invention is not limited to a particular protocol and hence to a particular packet header when modifying the packetized data. As will be appreciated by the person skilled in the art, the reason why a network node may not forward, i.e. route, packetized data will be as diversified as there are parameters and components of all implemented headers. Thus, the invention provides an advantageous algorithm of modifying any header portion of packetized data to avoid blocking of packetized data by intermediate network nodes. As a consequence, the invention provides for path finding from a user terminal to a gateway, if a standard or default path is unavailable.

The invention can easily be adapted to any new protocol and any new header, and hence to any new header components that may be implemented in future data communications.

Turning back to FIG. 6, the modified packetized data is output at step 650. For example, the modified packetized data may be output via the bus 215 to the transmitting unit 270 for transmission to the gateway. On the other hand, the modified packetized data may be placed back in the storage module or transmission buffer from which it was received.

Figure 7A:
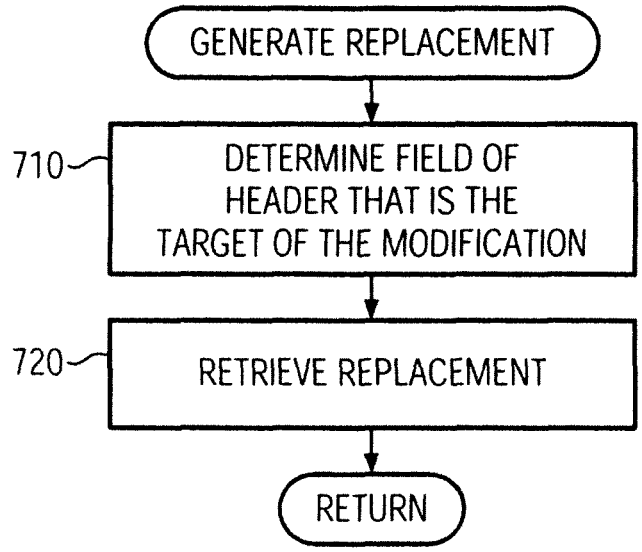
FIG. 7A is a flow diagram illustrating a method of generating a replacement for a part of a header according to an embodiment of the invention.

Turning now to FIG. 7A, the generating of a replacement for at least a part of a header is illustrated in more detail. As outlined above in view of step 630 of FIG. 6, a replacement is generated to modify the packetized data.

If only a part of a header will be the target of the modification, the field of the header which will be modified is determined at step 710. For instance, each header will be structured in accordance with a specific protocol. Thus, each field of the header is determinable according to the specific protocol. The result of the determination may include a current value of the field, a possible size of the field values, etc.

Further, at step 720, the replacement is retrieved. This may be done by generating a replacement or by retrieving data from another unit of the device, such as the packetizing unit. For instance, alternative values for the field may be in accordance with an alternative protocol different from the specific protocol. Thus, the packetizing unit may provide such data when the packetizing unit is informed of the alternative protocol.

Alternatively, the replacement may be a new value for a destination port field. This new value may be loaded from the configuration file mentioned above. Alternatively, a new value may be selected from a list of possible values.

Figure 7B:
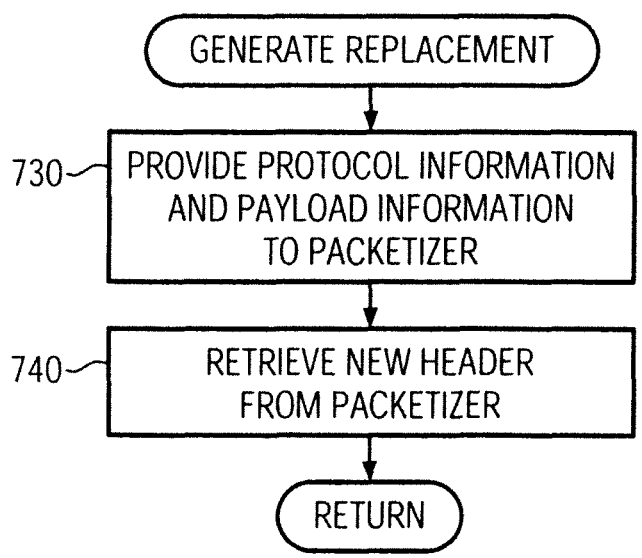
FIG. 7B is a flow diagram illustrating a method of generating a replacement of a complete header according to an embodiment of the invention.

Turning now to FIG. 7B, the generating of a complete header is illustrated in more detail as generally described in step 630 of FIG. 6. The method illustrated in FIG. 7B may be performed by the modification unit 260 in combination with the packetizing unit 240 of FIG. 2.

Beginning with step 730, the packetizer or packetizing unit 240 is configured according to the respective protocol. This initiation of the packetizing unit 240 is preferably done at the beginning of this method. For instance, protocol information and payload information is provided to the packetizing unit 240. This may be done by the modification unit 260 which has access to a payload of a particular data packet which has been identified for modification. The payload information provided to the packetizing unit may, for example, include the length of the payload or whether the data is encrypted or not. The invention is not restricted to such information, but includes all information the packetizing unit needs to create a new header in accordance with the protocol identified by the protocol information.

In accordance with the example outlined above, where the packetizer comprises a plurality of components, modules, units or objects, the protocol information identifies a particular component, module, unit or object. Thus, the packetizer is capable of employing the respective component, module, unit or object.

According to a preferred aspect, step 740 includes providing the complete payload to the packetizer 240. Together with the protocol information, the packetizer can pass the payload to the respective module, such as modules 290 to 298 depicted in FIG. 2B. For instance, the data may be provided to an interface of the frontend 290 for further processing. On the other hand, the payload may be provided to the TCP module 295 for the creation of a TCP header.

In a further aspect, the protocol information may indicate more than one protocol. For example, if more than one header needs to be created or exchanged, the packetizing unit may provide the payload information or a complete payload to a protocol stack, i.e. to a plurality of modules in a predetermined order. As an example, a payload may be provided to the frontend 290, then to the TCP module 295 and subsequently to the IP module 298.

The packetizing unit outputs a new data packet and provides it to the modification unit 260. Alternatively, the packetizing unit 240 outputs only the new header which has been created in accordance with the protocol information and the payload information.

At step 740, the new data packet or new header is retrieved from the packetizing unit 240. The method would then return to the method steps of FIG. 6, where the newly created header will be a replacement for a complete header of the identified data packet (see step 640).

The employing of the packetizing unit 240 provides the advantage that specialized units can be implemented in the process of the invention. In detail, since the packetizing unit is specialized for creating headers and data packets in accordance with protocols of a predetermined protocol stack, the creation of a new header may be accomplished more efficiently than by another unit, such as the modification unit 260. On the other hand, if only minor modifications are necessary, the modification unit 260 may be faster to realize the modification, since employing and transmitting data to other units may be time and processing resource consuming. In this case, however, the modification unit 260 needs to be capable of identifying, within the packetized data, the specific header and/or specific header components to be replaced.

Figure 7C:
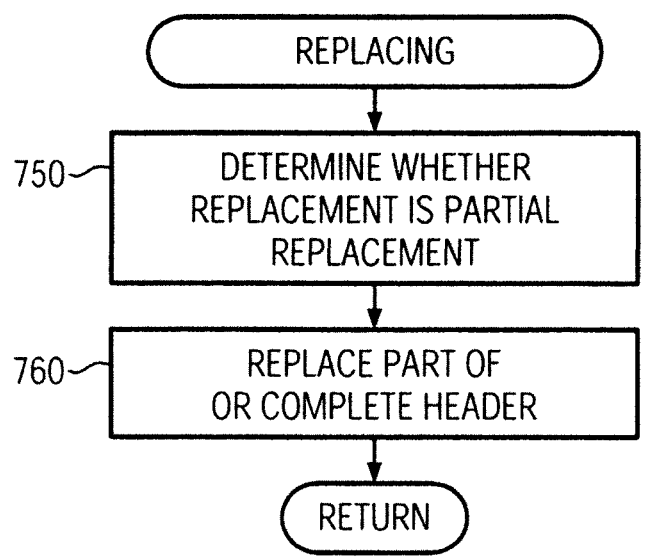
FIG. 7C is a flow diagram illustrating a method of replacing a header according to an embodiment of the invention.

With respect to FIG. 7C, the replacing of the part of the header is described in more detail. The steps of the method of FIG. 7C relate to step 640 of FIG. 6.

In detail, at step 750, it is determined whether a replacement for only a part of the header was generated or whether a complete new header was generated.

Based on a result of the determination, the part of the header or the complete header is replaced at step 760. The replacing may be performed by the modification unit 260. In an alternative, if the complete header is replaced, it may be more advantageous to have the packetizing unit 240 replacing the complete header. For instance, as mentioned above with respect to FIG. 7B, the packetizing unit may re-packetize a corresponding payload with the new header.

Figure 9:
FIG. 9 illustrates the internal structure of headers during the method of modifying data according to an embodiment of the invention.
Figure 9:
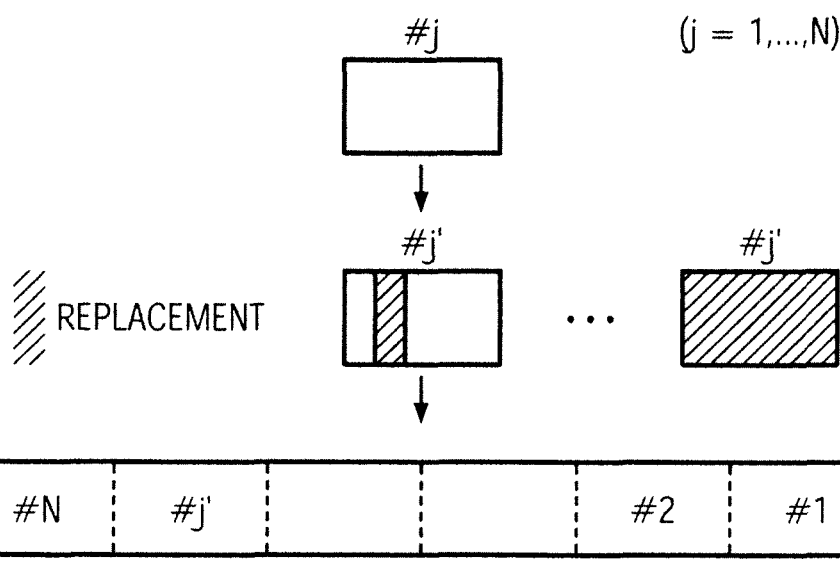
Figure 9:
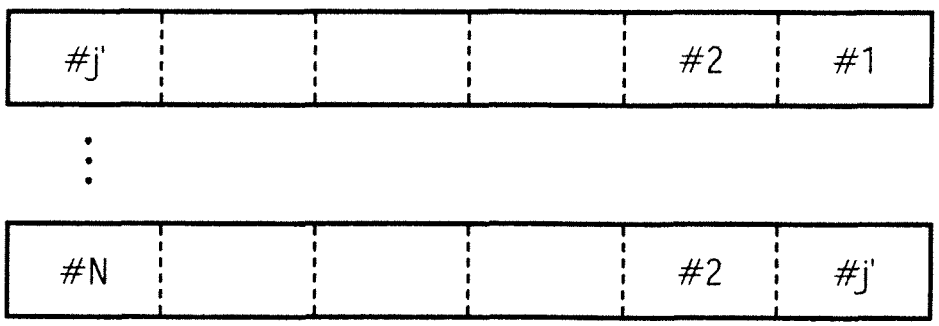

Referring to FIG. 9 depicting the replacing of at least a part of a header in more detail, FIG. 9 illustrates a header portion of packetized data. The depicted header portion includes particular headers referred to as number 1 (also referred to as "#1") to number N.

Further, a particular header referred to as "j" is identified as the one to which a replacement will be made. The particular header j will then be modified by replacing either a part or the complete header resulting in a modified header j'. According to FIG. 9, the header j, and hence also j', may be any one of headers #1 to #N.

As an example, the replacement may relate to the destination port number. If the data to be transmitted has been packetized according to UDP, the replacement may be to change the destination port value from 500 to 80. While 500 is a standard value for ISAKMP, the value 80 is a standard destination port for HTTP/TCP communications. Thus, the modified data may pass through any node, since port 80 is usually not blocked.

As already stated above, the invention is not limited to a replacement within a single header. It is also within the scope of the invention that more than one header will be modified as discussed below.

Figure 10A:
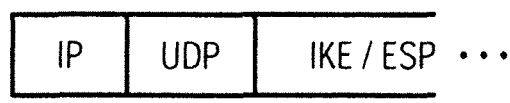
FIG. 10A illustrates the internal structure of a simplified IKE or ESP data packet with header.
Figure 10B:
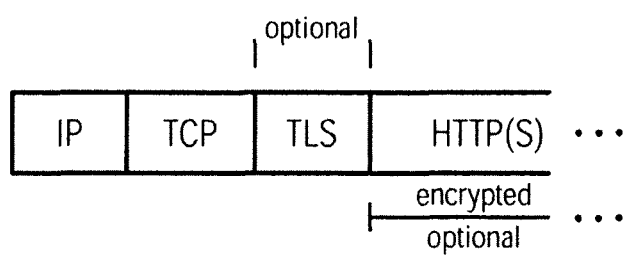
FIG. 10B illustrates the internal structure of a simplified HTTP(S) data packet with header.

Referring now to FIGS. 10A and 10B, the configuration of particular data packets is depicted in more detail. FIG. 10A illustrates a typical data packet which has been generated according to the IKE or ESP protocol and has subsequently been processed by the UDP and IP protocol modules. For instance, with respect to FIG. 2B, the IKE module 291 generates key exchange data, which is provided to the UDP module 296 and subsequently to the IP module 298. The resulting data packet is depicted in FIG. 10A. It is to be noted that only two headers are depicted, while the data packet may include more headers or tails without departing from the scope of the invention.

According to a further example, after a key exchange and authentication has been performed, data can be transmitted using the ESP protocol. This involves the generation of a "normal" data packet employing, for example, the TCP module 295 and IPsec module 297. The latter module (297) is responsible for encrypting the data before it is transmitted to, for example, a gateway. Since the data is encrypted, a non-encrypted transport and network header needs to be generated. Thus, the IPsec module 297 can forward the encrypted data to the UDP module 296 and IP module 298. As a consequence, a data packet according to FIG. 10A has been generated.

Turning now to FIG. 10B, an HTTP packet is illustrated. FIG. 10B depicts data which has been processed by, for example, HTTP module 292, TCP module 295 and IP module 298 of FIG. 2B.

Another option for sending HTTP data would involve security, such as encryption of the HTTP data. In this case, an HTTPS module (not shown in FIG. 2B) would generate HTTP data in an encrypted form. This encrypted data would then be processed by a TLS module (not shown in FIG. 2B) and subsequently by TCP module 295 and IP module 298. The resulting data packet is depicted in FIG. 10B.

Figure 11:
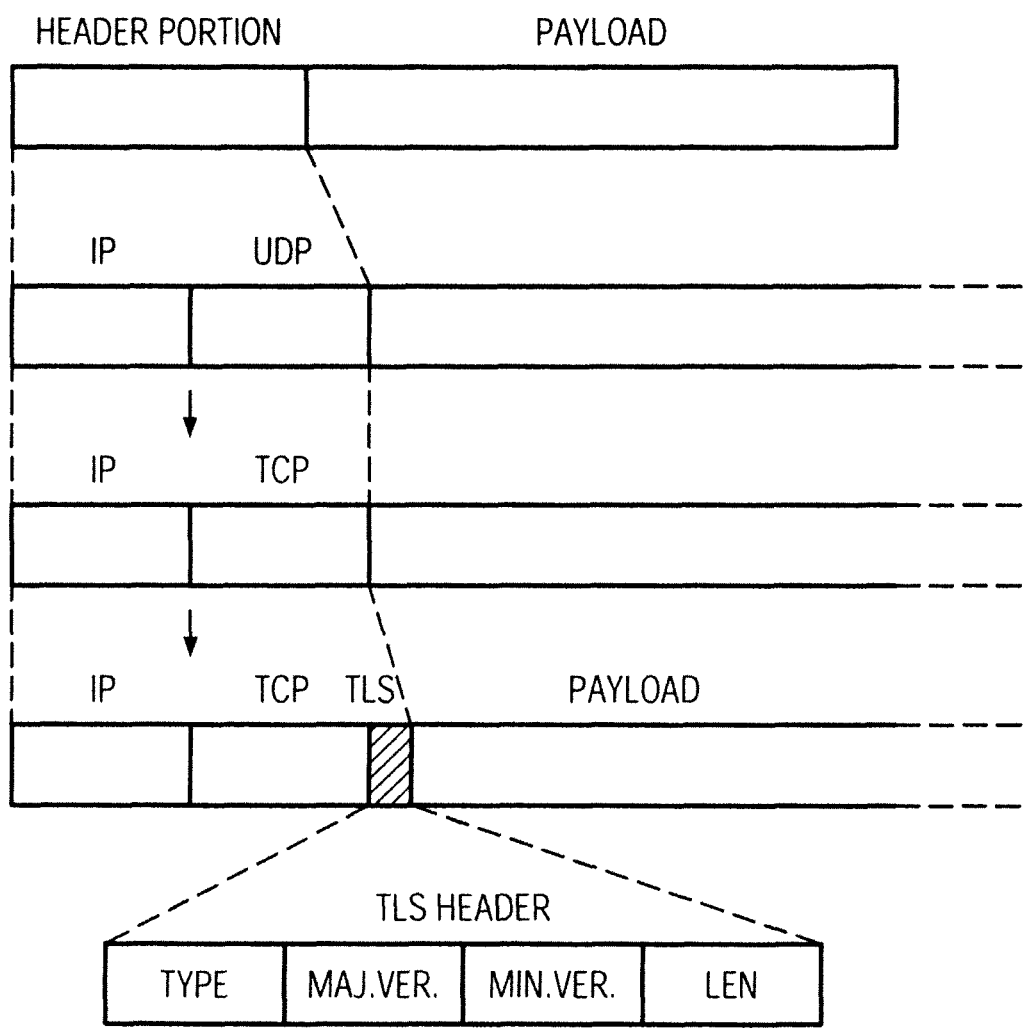
FIG. 11 depicts the internal structure of data packets during the method of modifying data according to a detailed embodiment of the invention.

Referring now to FIG. 11, a preferred aspect is illustrated. In detail, FIG. 11 depicts the replacement of a particular header within packetized data. This data modification may relate to data transmissions found during a VPN communication. For example, data to establish a VPN between a user terminal and a gateway includes an initiation procedure according to ISAKMP using IKE.

As can be seen in FIG. 11, the header portion comprises an IP-header and a UDP-header. It is to be noted that only two headers are depicted in FIG. 11 for simplification of the drawing. This data packet corresponds to what is shown in FIG. 10A.

As noted above, a UDP-header may not pass through an intermediate network node due to the blocking of any UDP-related port numbers. The invention therefore modifies the header portion of the packetized data by replacing the UDP-header with a TCP-header. To be in conformance with the standard, the TCP-header may use the port numbers 80 or 443. Such a packetized data including a TCP-header and corresponding port number may pass through the intermediate network node.

Alternatively, more than one header will be modified by replacing a part of it or replacing the complete header. For instance, if one header will be modified in such an extent that the header of another layer also needs to be modified, at least two headers will include replacements.

Following the above example, if the UDP-header will be replaced completely, the IP-header can be modified as well. In particular, an IP-header usually includes a protocol ID of the underlying transport protocol. Thus, the protocol ID of the IP-header also needs to be replaced with the correct value, in this case the protocol ID for TCP.

Whether or not a second header is modified, may depend on a configuration of the device. For example, if a first modification has taken place, the user terminal may try to send the modified packetized data. If the data does not pass the node a second time, e.g. a second timeout occurs, a second header may also be modified and the user terminal may then try to re-send the packetized data including two modified headers.

As already noted above with respect to FIG. 2B, the modification of header data may be controlled by a module, such as the frontend module 290. According to a preferred aspect, the invention may be employed for VPN tunnelling and secure data communications. For this reason, the IKE module 291 and IPsec module 297 have been modified slightly compared to standard modules. This modification of the modules 291 and 297 results in forwarding of processed data to the frontend 290 instead of the standardized protocol module. Continuing with the VPN example, if modification of headers is necessary, the IKE module 291 forwards its generated data to the frontend 290. The frontend 290 would then forward the data to the TCP module 295, while it would have been forwarded to the UDP module 297 (directly from the IKE module) in the standardized way. The data is then provided to the IP module 298 resulting in the data packet depicted in the third line of FIG. 11.

In case the data is an ESP packet, i.e. data to be communicated via an established VPN tunnel, the IPsec module 297 will forward the data to the frontend 290 instead of to the UDP module 296. Again, the frontend 290 forwards the data to the TCP module 295 and IP module 298. As a consequence, a data packet according to the third data shown in FIG. 11 will be build.

With respect to FIG. 11, it has to be noted that the payload of the packetized data still includes the payload of the UDP-datagram. Thus, the third depicted packetized data appears not to be in conformance with standard data packets. If such a packetized data would be received by any computing device, the computing device may not be able to depacketize the data. In detail, since the packetized data would be provided to a depacketizing entity for the TCP-protocol, the corresponding payload may not be retrieved, since it corresponds to the UDP-protocol.

The invention however provides a preconfigured gateway, which is capable of receiving packetized data using UDP and TCP. The gateway, however, expects the payload to be packetized according to the UDP-protocol independent of the type of header found in the header portion of the packetized data.

A packetized data modified in this manner may pass through any network node. As an example, the TCP-header may use the destination port 80. In this case, the intermediate network node would determine that the packetized data is a "normal" HTTP packet.

If, however, the payload would be encrypted, the packetized data may be filtered by the network node. In detail, the network node may check whether the IP- and TCP-headers are correct and correspond to the attached payload. For instance, a checksum being part of these headers may be checked against the payload.

To allow the packetized data to pass through the network node, the TCP-header can be modified by including the destination port number 443, which is the standardized port number for HTTPS, i.e. secure/encrypted data. Since the network node is aware that data sent on port 443 will be encrypted, a proof of the checksum may not be performed. In such a case, the intermediate network node may route the data to the gateway, e.g. to the destination address indicated in the IP header.

Nevertheless, the packetized data may still not pass through the network node. For instance, the network node may expect a transport layer security (TLS) header being present in the header portion, since the data is sent on port 443. In detail, TLS is a cryptographic protocol employed with HTTPS.

Since the payload of the packetized data was not created according to these protocols, a new header may be supplemented at a bit-position that is usually used for TLS-headers. For instance, a TLS-header can directly follow the TCP-header. In other words, the TLS-header is inserted between the modified/replaced header and the corresponding payload. Alternatively, the TLS-header is supplemented before the data is provided to the frontend 290, TCP module 295 and IP module 298 (see FIG. 2B). Such a TLS-header does not need to correspond to the actual data of the packetized data. For this reason, the user terminal of the invention generates a TLS-header only to imitate an HTTPS-transmission.

The advantage of this can be seen in the encrypted nature of the secure data transmissions. Since a network node can only check the header portion of the secure packetized data, the transmitted payload does not need to correspond to the header portion.

Figure 12A:
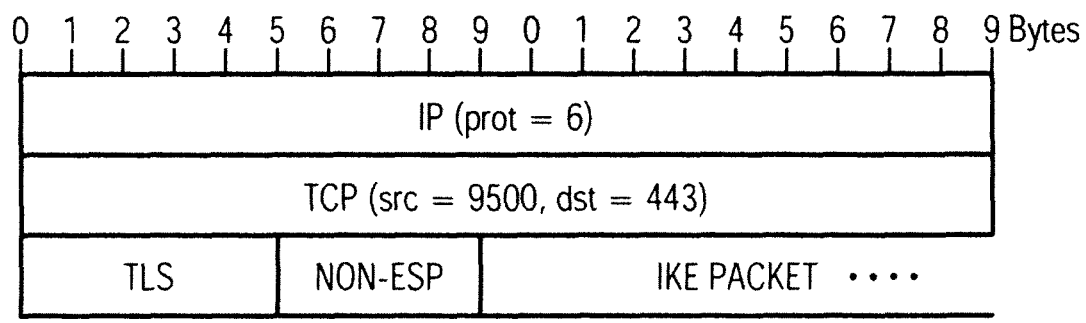
FIG. 12A illustrates the internal structure of a header of a modified IKE data packet according to a particular embodiment of the invention.
Figure 12B:
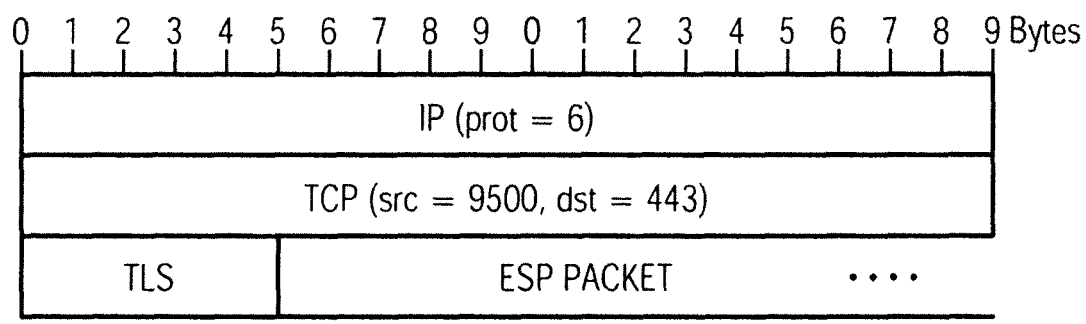
FIG. 12B illustrates the internal structure of a header of a modified ESP data packet according to a particular embodiment of the invention.
Figure 12C:
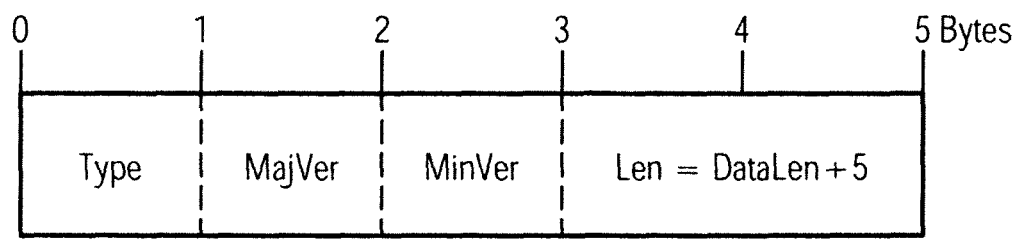
FIG. 12C illustrates the internal structure of an additional header after modification of data according to a particular embodiment of the invention.

Referring now to FIG. 12, the header structure of the modified packetized data is depicted in more detail. FIG. 12A depicts a new IP-header indicating the protocol ID value 6 identifying TCP. The next header is the TCP-header identifying a source and destination port. Following is a TLS-header which will be depicted in more detail in FIG. 12C.

In case of the setup of a secure connection, such as a VPN tunnel between a user terminal and a predetermined gateway, the packetized data may be an IKE-packet. To allow the gateway to distinguish between IKE-packets and "normal" data packets, a further additional header is added between the TLS-header and the user data. This second new header is referred to as a non-ESP header, which indicates that the data does not correspond to an encapsulating security payload (ESP). Since only these two types of packets are expected to be received at the gateway, the non-ESP header will indicate an IKE-packet.

Such a non-ESP header may include, for example, four octets of zeros. Such a value would not be expected, since it is not part of any standardized header.

The preconfigured gateway may, for example, include a dispatcher which intercepts any incoming data packet. After receiving an incoming data packet, the dispatcher may analyze the header structure of the data packet. If the dispatcher finds the non-ESP header, for example, it detects the four octets of zeros, the dispatcher can forward the data to the IKE module installed on the gateway. On the other hand, if this specific bit structure is not detected, the dispatcher will forward the data to the IPsec module installed on the gateway.

According to FIG. 12B, an ESP-packet is depicted, which comprises identical IP-header, TCP-header and TLS-header as illustrated in FIG. 12A. As can be seen when comparing both Figs., the ESP-packet does not include the non-ESP header. Thus, a gateway receiving such packetized data is able to differentiate between this packet type and an IKE-packet.

Finally, FIG. 12C depicts the TLS-header in more detail. The TLS-header includes a field indicating the type, a field indicating the major version of TLS, a field indicating the minimum version and a field indicating the length.

The first three fields may be the same for all TLS-headers used, since the type will indicate that the data includes TLS content, the major version will refer to the newest or latest available TLS protocol version and the minimum version could have the value 1. The length field indicates the data length of the packetized data, i.e. the payload portion, plus the length of the TLS header, which is 5 bytes.

For instance, the type field may include the type value 23, which is interpreted by a module analyzing TLS-headers as encrypted application data. This TLS type indicates to any component analyzing the header that the data following the TLS-header contains only encrypted data. Thus, the data after the TLS-header cannot be processed without the corresponding key. As an example, a network node analyzing the headers of a data packet to decide whether the data packet is forwarded or not, can not perform any processing on the payload, since it is encrypted. The network node can detect this according to the field "type" of the TLS-header.

According to another aspect of the invention, the network node 122 (see FIG. 1) may be a proxy computing device. In this case, the establishing of a secure connection, such as a VPN tunnel, may also fail when following the standard protocol. In particular, the proxy device may not forward UDP packets which are usually created when establishing a secure connection according to IKE and when transmitting encrypted/secure data packets via an established secure connection using IPsec.

On the other hand, the UDP packets may be forwarded by the proxy to the respective gateway, but data packets returning from the gateway to the user terminal may be blocked, i.e. filtered by the proxy.

This problem is also solved by the technique of the present invention. In detail, with respect to FIG. 2B, the frontend 290 will establish a TCP connection. As outlined above, the frontend 290 determines whether a TCP connection is established when it receives any data from the IKE module 291 or the IPsec module 297. The frontend 290 will establish the TCP connection with the proxy device 122 instead of the gateway 132. After establishing the TCP connection with the proxy, it is the proxy device 122 which connects to the gateway 132.

Afterwards, the user terminal is capable of sending TCP/IP packets via both TCP connections, i.e. to the proxy and from there to the gateway. Since most proxy devices allow the very common TCP/IP data communications, a secure tunnel using IPsec with TCP encapsulation can be established "through" a proxy device.

It is therefore transparent for any application running on the user terminal whether the secure connection to the gateway is established directly or via an intermediate network node, such as a router or proxy device, which may filter or block particular data types. The present invention therefore provides a path finding method and system to allow secure data sessions via a secure tunnel, independent of the type and configuration of any intermediate network node.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A user terminal for transmitting data to a predetermined gateway via data communication networks and at least one network node, wherein the user terminal is connected to a first data communication network, wherein a first network node is connected to the first data communication network and a second data communication network, and wherein the predetermined gateway is a second network node connected to the second data communication network and a third data communication network, the user terminal comprising:
 a packetizing unit that packetizes input data according to protocols corresponding to a predetermined protocol stack by forming, for each of the protocols of the predetermined protocol stack, a respective data packet including a respective header and a respective payload segment, wherein the header corresponds to the payload according to the predetermined protocol stack, and wherein the packetizing unit outputs packetized data;

a transmitting unit that transmits the packetized data to the predetermined gateway via the first network node and via the first and second data communication networks;

a determination unit that determines whether the packetized data arrived at the predetermined gateway; and a modification unit that modifies the packetized data based on an output of the determination unit, wherein the modification unit replaces at least a User Datagram Protocol (UDP) portion of a first header in the packetized data with a Transport Control Protocol (TCP) replacement header, wherein the replaced User Datagram Protocol (UDP) portion of the first header corresponds to a specific protocol of the predetermined protocol stack, and wherein the TCP replacement header does not correspond to a valid protocol of the predetermined protocol stack according to the payload, wherein the modification unit further modifies the packetized data by inserting an artificial Transport Layer Security (TLS) header into the packetized data.

2. The user terminal according to claim 1, wherein the transmitting unit transmits the modified packetized data to the predetermined gateway via the first network node and via the first and second data communication networks.

3. The user terminal according to claim 1, wherein the modification unit replaces the complete first header with a second header, wherein the first header corresponds to a header resulting from packetizing the input data according to a User Datagram Protocol (UDP) comprised in the predetermined protocol stack, and wherein the second header corresponds to a header resulting from packetizing the input data according to a replacement protocol comprising a TCP protocol not comprised in the predetermined protocol stack.

4. The user terminal according to claim 3, wherein the modification unit provides protocol information to the packetizing unit, wherein the protocol information identifies the replacement protocol, and wherein the packetizing unit forms the second header according to the protocol information.

5. The user terminal according to claim 1, wherein the modification unit replaces a UDP destination port number with a Hypertext Transport Protocol Secure (HTTPS) destination port number.

6. The user terminal according to claim 1, further comprising:

a storage unit that stores a header configuration of the packetized data, the header configuration including information identifying the replacement;

wherein the packetizing unit packetizes subsequent input data according to the protocols corresponding to the predetermined protocol stack and according to the header configuration, thereby forming subsequent packetized data having at least a part of a first header replaced with a replacement, and wherein the transmitting unit transmits the subsequent packetized data to the predetermined gateway via the first network node and via the first and second data communication networks.

7. The user terminal according to claim 1, wherein the determination unit determines whether a reply message from the predetermined gateway was received at the user terminal.

8. The user terminal according to claim 7, wherein the determination unit determines whether the reply message was not received at the user terminal within a predetermined time period after the transmitting unit has transmitted the packetized data.

9. A gateway for communicating data to and from at least one user terminal via data communication networks and at least one network node, wherein the at least one user terminal is connected to a first data communication network, wherein a first network node is connected to the first data communication network and a second data communication network, and wherein the gateway, being a second network node, is connected to the second data communication network and a third data communication network, the gateway comprising:

a receiving unit that receives packetized data from a specific user terminal, the packetized data being packetized according to protocols corresponding to a predetermined protocol stack by forming, for each of the protocols of the predetermined protocol stack, a respective data packet including a respective header and a respective payload segment;

a detecting unit that detects whether at least a part of a first header in the packetized data was replaced with a Transport Control Protocol (TCP) replacement header and that outputs replacement information indicating at least the first header, wherein the TCP replacement header does not correspond to the payload according to a valid protocol stack;

a depacketizer that depacketizes the packetized data by replacing the Transport Control Protocol (TCP) replacement header a User Datagram Protocol (UDP) header and by removing at least an artificial Transport Layer Security (TLS) header from the packetized data and generating a payload segment according to at least one respective protocol of the predetermined protocol stack; and a transmitting unit that transmits a message to the specific user terminal, the message indicating that the packetized data arrived at the gateways.

10. The gateway according to claim 9, wherein the depacketizer receives data on at least two network ports, wherein a first port number corresponds to a value standardized for the predefined protocol and wherein a second port number corresponds to a value standardized for the TCP replacement protocol.

11. A method for communicating data to and from a predetermined gateway via data communication networks and at least one network node, wherein a user terminal is connected to a first data communication network, wherein a first network node is connected to the first data communication network and a second data communication network, and wherein the predetermined gateway is a second network node connected to the second data communication network and a third data communication network, the method comprising:

generating packetized data, wherein generating comprises packetizing input data according to protocols corresponding to a predetermined protocol stack by forming, for each of the protocols of the predetermined protocol stack, a respective data packet including a respective header and a respective payload segment, wherein the respective header corresponds to the respective payload segment according to the predetermined protocol stack;

transmitting the packetized data from the user terminal to the predetermined gateway via the first network node and via the first and second data communication networks;

determining whether the packetized data arrived at the predetermined gateway; and modifying the packetized data based on a result of the determining, wherein modifying comprises replacing at least a User Datagram Protocol (UDP) portion of a first header in the packetized data with a Transport Control Protocol (TCP) replacement header, wherein the replaced User Datagram protocol (UDP) of the first header corresponds to a specific protocol of the predetermined protocol stack, and wherein the TCP replacement header does not correspond to the payload according to a valid protocol stack, wherein modifying further comprises inserting an artificial Transport Layer Security (TLS) header into the packetized data.

12. The method according to claim 11, wherein modifying the packetized data comprises replacing the complete first header with a second header.

13. The method according to claim 12, wherein the first header corresponds to a header resulting from packetizing the input data according to a User Datagram Protocol (UDP) of the predetermined protocol stack, and wherein the second header corresponds to a header resulting from packetizing the input data according to a TCP replacement protocol not comprised in the predetermined protocol stack.

14. The method according to claim 13, wherein replacing the first header with the second header comprises forming the second header according to protocol information, the protocol information identifying the replacement protocol.

15. The method according to claim 11, wherein modifying the packetized data comprises replacing a destination port number field, wherein the value of the destination port number field is a value standardized for a UDP protocol according to which the input data was packetized, and wherein this value is replaced by a value of a destination port number field standardized for a Hypertext Transfer Protocol Secure (HTTPS) protocol.

16. The method according to claim 11, further comprising:
storing a header configuration of the packetized data, the header configuration including information identifying the replacement;
packetizing subsequent input data according to the protocols corresponding to the predetermined protocol stack and according to the header configuration, wherein packetizing subsequent input data comprises forming subsequent packetized data having at least a part of a header replaced with a replacement; and
transmitting the subsequent packetized data from the user terminal to the predetermined gateway via the first network node and via the first and second data communication networks.

17. The method according to claim 11, wherein determining whether the packetized data arrived at the predetermined gateway comprises determining whether a reply message from the predetermined gateway was received at the user terminal.

18. The method according to claim 17, wherein determining whether the packetized data arrived at the predetermined gateway comprises determining whether the reply message was received at the user terminal within a predetermined time period after transmitting the packetized data.

19. A method for communicating data to and from at least one user terminal via data communication networks and at least one network node, wherein the at least one user terminal is connected to a first data communication network, wherein a first network node is connected to the first data communication network and a second data communication network, and wherein a gateway, being a second network node, is connected to the second data communication network and a third data communication network, the method comprising:
receiving, at the gateway, packetized data from a specific user terminal, the packetized data being packetized according to protocols corresponding to a predetermined protocol stack by forming, for each of the protocols of the predetermined protocol stack, a respective data packet including a respective header and a respective payload segment;
detecting whether at least a part of a first header in the packetized data was replaced with a Transfer Control Protocol (TCP) replacement header, wherein the TCP replacement header does not correspond to the payload according to a valid protocol stack;
outputting replacement information indicating at least the first header;
depacketizing the packetized data, wherein depacketizing comprises replacing the Transport Control Protocol (TCP) replacement header with a User Datagram protocol (UDP) header and by removing at least an artificial Transport Layer Security (TLS) header from the packetized data and generating a payload segment according to at least one respective protocol of the predetermined protocol stack; and
transmitting a message from the gateway to the specific user terminal, the message indicating that the packetized data arrived at the gateway.

20. The method according to claim 19, wherein receiving packetized data comprises receiving data on at least two network ports, wherein a first port number corresponds to a value standardized for the predefined UDP protocol and wherein a second port number corresponds to a value standardized for the TCP replacement protocol.

21. A non-transitory computer-readable medium having computer-executable instructions stored thereon to perform, when executed by a processor of a user terminal, a method for communicating data to and from a predetermined gateway via data communication networks and at least one network node, wherein the user terminal is connected to a first data communication network, wherein a first network node is connected to the first data communication network and a second data communication network, and wherein the predetermined gateway is a second network node connected to the second data communication network and a third data communication network, the method comprising:
generating packetized data, wherein generating comprises packetizing input data according to protocols corresponding to a predetermined protocol stack by forming, for each of the protocols of the predetermined protocol stack, a respective data packet including a respective header and a respective payload segment, wherein the respective header corresponds to the respective payload segments according to the predetermined protocol stack and the predetermined protocol stack comprises a User Datagram Protocol (UDP) and the payload comprises a respective UDP payload segment;
transmitting the packetized data from the user terminal to the predetermined gateway via the first network node and via the first and second data communication networks;
determining whether the packetized data arrived at the predetermined gateway; and
modifying the packetized data based on a result of the determining, wherein modifying comprises replacing at least a User Datagram Protocol (UDP) portion of a first header in the packetized data with a Transport Control Protocol (TCP) replacement header, wherein the replaced User Datagram protocol (UDP) of the first header corresponds to a specific protocol of the predetermined protocol stack, and wherein the TCP replacement header does not correspond to the UDP payload according to a valid protocol stack, wherein modifying further comprises inserting an artificial Transport Layer Security (TLS) header into the packetized data.

* * * * *

UNITED STATES PATENT AND TRADEMARK OFFICE
CERTIFICATE OF CORRECTION

| | |
|---|---|
| PATENT NO. | : 8,811,397 B2 |
| APPLICATION NO. | : 12/706456 |
| DATED | : August 19, 2014 |
| INVENTOR(S) | : Andreas Baehre |

It is certified that error appears in the above-identified patent and that said Letters Patent is hereby corrected as shown below:

In the Claims:

Column 40, Claim 9, line 26: "header a User Datagram Protocol" should read --header with a User Datagram Protocol--.

Signed and Sealed this
Eleventh Day of November, 2014

Michelle K. Lee
*Deputy Director of the United States Patent and Trademark Office*